US012631445B2

(12) United States Patent
Suzuki

(10) Patent No.: US 12,631,445 B2
(45) Date of Patent: May 19, 2026

(54) METHODS AND APPARATUS FOR IDENTIFYING SUBSTRATES SUITABLE FOR USE IN MAGNETIC RECORDING MEDIA

(71) Applicant: Western Digital Technologies, Inc., San Jose, CA (US)

(72) Inventor: Shoji Suzuki, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 492 days.

(21) Appl. No.: 18/224,680

(22) Filed: Jul. 21, 2023

(65) Prior Publication Data

US 2025/0003743 A1 Jan. 2, 2025

Related U.S. Application Data

(60) Provisional application No. 63/523,792, filed on Jun. 28, 2023.

(51) Int. Cl.
G01B 21/08 (2006.01)

(52) U.S. Cl.
CPC .................................... G01B 21/08 (2013.01)

(58) Field of Classification Search
CPC .......... G01B 21/08; G01B 11/06; G01B 7/06; G01B 5/06; G01B 7/02
See application file for complete search history.

(56) References Cited

U.S. PATENT DOCUMENTS 5,497,085 A 3/1996 Tian et al.
6,894,854 B1 * 5/2005 Carlson ................ G11B 5/6005

(Continued)

FOREIGN PATENT DOCUMENTS

JP 2007193932 A 8/2007
JP 2013025844 A 2/2013
(Continued)

OTHER PUBLICATIONS

Suzuki, S., et al., "Effect of Radial Curvature of Magnetic Media on Glide Avalanche", IEEE Transactions on Magnetics; vol. 41, Issue 2; Feb. 2005; https://ieeexplore.ieee.org/document/1396193; 4 pages.

(Continued)

*Primary Examiner* — Stephen D Meier
*Assistant Examiner* — Quang X Nguyen
(74) *Attorney, Agent, or Firm* — LOZA & LOZA, LLP; Gabriel X. Fitch

(57) ABSTRACT

Methods and apparatus of identifying a substrate suitable for use within a magnetic medium of a data storage device configured for magnetic recording are described. In an aspect, the method includes identifying dimensions of a slider of the data storage device to be used in conjunction with the magnetic medium and determining a measurement length and a localized height threshold as a function of the dimensions of the slider. The method further includes measuring localized height values of the substrate at distances from a center of the substrate, each of the localized height values measured within the measurement length and at one of the distances, comparing the localized height values and the localized height threshold, and determining to utilize the substrate for the magnetic medium based on the comparison of the localized height values and the localized height threshold.

21 Claims, 14 Drawing Sheets

(56)                    References Cited

U.S. PATENT DOCUMENTS

| | | | |
|---|---|---|---|
| 9,183,866 B2 | 11/2015 | Takizawa et al. | |
| 9,799,364 B2 | 10/2017 | Adachi et al. | |
| 10,607,647 B2 | 3/2020 | Takizawa et al. | |
| 2002/0135362 A1 | 9/2002 | Lee et al. | |
| 2007/0245814 A1* | 10/2007 | Shitara ................. | G11B 5/4555 |
| | | | 73/104 |

FOREIGN PATENT DOCUMENTS

| | | | |
|---|---|---|---|
| JP | 2013140649 A | 7/2013 | |
| WO | 2006025572 A1 | 3/2006 | |

OTHER PUBLICATIONS

Li, Xu Hong, "Numerical Simulation of Slider Air Bearings in Head-Disk Interface System based on a Mesh-Free Method", School of Mechanical & Aerospace Engineering; Nanyang Technological University; 2006; https://doi.org/10.32657/10356/6078; 250 pages.

Matthes, Liane M. et al., "Near Contact Thermal Flying Height Control in Hard Disk Drives", IEEE Transactions on Control Systems Technology; vol. 25, Issue 1; Jan. 2017; https://ieeexplore.ieee.org/document/7448419; 5 pages.

Qian, Weimin et al., "Disk Shape and Its Effect on Flyability", IEEE Transactions on Magnetics; vol. 39, Issue 2; Mar. 2003; https://ieeexplore.ieee.org/document/1190093; 5 pages.

* cited by examiner

Position B

α = skew angle

808

820b

W

L

α

α

Measurement Length
= L * Sin(α) + W * Cos(α)

Data track

850

Position A

808

820a

W

L

Measurement Length

800

Overflow

Control

| Overflow | | Control | |
|---|---|---|---|
| —○— | Sample 1A | —◇— | Sample 2A |
| —□— | Sample 1B | —✛— | Sample 2B |
| —△— | Sample 1C | —◊— | Sample 2C |
| —○— | Sample 1D | —△— | Sample 2D |
| —✦— | Sample 1E | —✳— | Sample 2E |

Femto head

| Skew Angle | W (mm) | L (mm) | Measurement length (mm) | Acceptable XRC (mm) |
|---|---|---|---|---|
| 0 | 0.7 | 0.7 | 0.70 | 245 |
| 5 | 0.7 | 0.7 | 0.76 | 288 |
| 10 | 0.7 | 0.7 | 0.81 | 329 |
| 15 | 0.7 | 0.7 | 0.86 | 368 |
| 20 | 0.7 | 0.7 | 0.90 | 402 |

1000

Pemto head

| Skew Angle | W (mm) | L (mm) | Measurement length (mm) | Acceptable XRC (mm) |
|---|---|---|---|---|
| 0 | 0.7 | 1.25 | 1.25 | 781 |
| 5 | 0.7 | 1.25 | 1.31 | 853 |
| 10 | 0.7 | 1.25 | 1.35 | 915 |
| 15 | 0.7 | 1.25 | 1.39 | 964 |
| 20 | 0.7 | 1.25 | 1.41 | 1000 |

1050

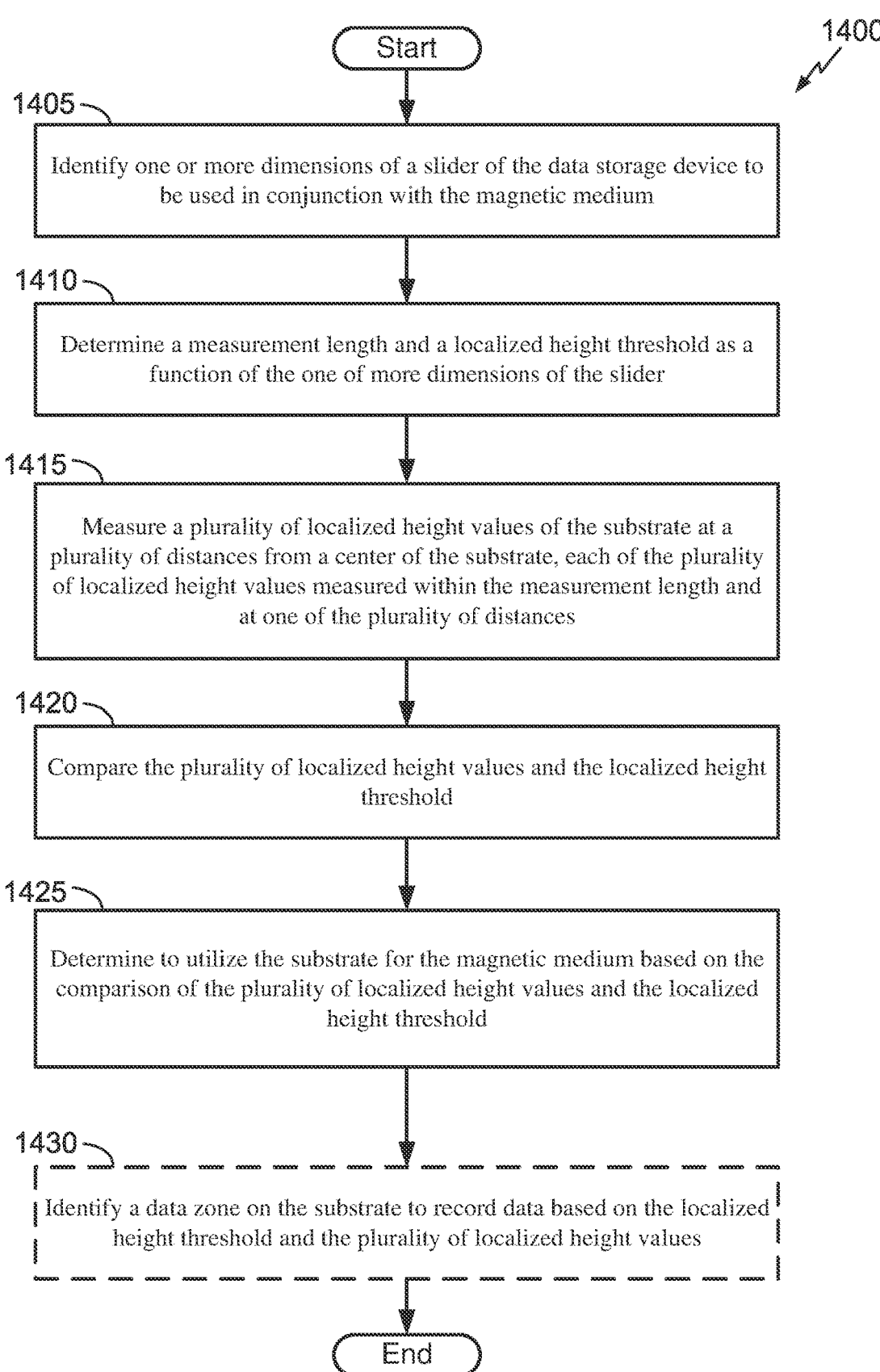

1400

Start

1405 — Identify one or more dimensions of a slider of the data storage device to be used in conjunction with the magnetic medium 1410 — Determine a measurement length and a localized height threshold as a function of the one of more dimensions of the slider 1415 — Measure a plurality of localized height values of the substrate at a plurality of distances from a center of the substrate, each of the plurality of localized height values measured within the measurement length and at one of the plurality of distances 1420 — Compare the plurality of localized height values and the localized height threshold 1425 — Determine to utilize the substrate for the magnetic medium based on the comparison of the plurality of localized height values and the localized height threshold 1430 — Identify a data zone on the substrate to record data based on the localized height threshold and the plurality of localized height values End

FIG. 14

METHODS AND APPARATUS FOR IDENTIFYING SUBSTRATES SUITABLE FOR USE IN MAGNETIC RECORDING MEDIA

CROSS-REFERENCE TO RELATED APPLICATIONS

This application claims priority to and the benefit of U.S. Provisional Patent Application No. 63/523,792, filed on Jun. 28, 2023 entitled, "METHODS AND APPARATUS FOR IDENTIFYING SUBSTRATES SUITABLE FOR USE IN MAGNETIC RECORDING MEDIA," the entire content of which is incorporated herein by reference.

FIELD

The present disclosure relates to magnetic recording media, and more specifically, to methods for identifying substrate suitable for use within a magnetic medium of a data storage device configured for magnetic recording.

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high-definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disk. When magnetic storage media uses a non-conductive substrate (such as a glass substrate and/or glass ceramic substrate), a conductive pre-seed layer may be deposited on the non-conductive substrate so that a bias voltage can be applied during the deposition of some or all of the subsequent media films to form the magnetic storage media. In some aspects, during a processing stage of the substrate, a surface of the substrate may not be uniform and may have height variations. These height variations may be considered in determining whether the substrate is suitable for use within a magnetic medium of a data storage device.

SUMMARY

In one aspect, a method of identifying a substrate suitable for use within a magnetic medium of a data storage device configured for magnetic recording is provided. The method includes identifying one or more dimensions of a slider of the data storage device to be used in conjunction with the magnetic medium; determining a measurement length and a localized height threshold as a function of the one or more dimensions of the slider; measuring a plurality of localized height values of the substrate at a plurality of distances from a center of the substrate, each of the plurality of localized height values measured within the measurement length and at one of the plurality of distances; comparing the plurality of localized height values and the localized height threshold; and determining to utilize the substrate for the magnetic medium based on the comparison of the plurality of localized height values and the localized height threshold.

In another aspect, a method of identifying a substrate suitable for use within a magnetic medium of a data storage device configured for magnetic recording is provided. The method includes identifying one or more dimensions of a slider of the data storage device to be used in conjunction with the magnetic medium; determining a measurement length and a localized height threshold as a function of the one or more dimensions of the slider; measuring a plurality of localized height values of the substrate at a plurality of distances from a center of the substrate, each of the plurality of localized height values measured within the measurement length and at one of the plurality of distances; comparing the plurality of localized height values and the localized height threshold; and identifying a data zone on the substrate to record data based on the comparison of the plurality of localized height values and the localized height threshold.

BRIEF DESCRIPTION OF THE DRAWINGS

FIG. 14 illustrates a method of identifying a substrate suitable for use within a magnetic medium of a data storage device configured for magnetic recording, according to some aspects.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

As discussed above, certain height variations on the surface of substrates (e.g., glass or metal substrates) may cause problems for magnetic recording systems and thereby render the substrates unsuitable for use therein. Methods of characterizing substrates for use in magnetic recording systems tend to focus on the overall flatness of the substrates. Herein, new methods of characterizing substrates are presented wherein instead of focusing on the overall flatness, the methods measure flatness (e.g., height deviations) in localized areas of the substrates with the size of the localized areas determined by the dimensions of the slider to be used with the finalized magnetic recording media that will be formed from the substrates. FIGS. 1-5 introduce an example of a magnetic recording system and details of the substrates that may be used therein. The remaining figures describe the new methods for characterizing substrates using localized height measurements. While the inventive techniques are presented herein primarily featuring glass substrates, the inventive techniques can also apply to substrates made of other suitable materials (e.g., metal) where the substrates are subjected to polishing and therefore have the height variations noted above.

Figure 1A:
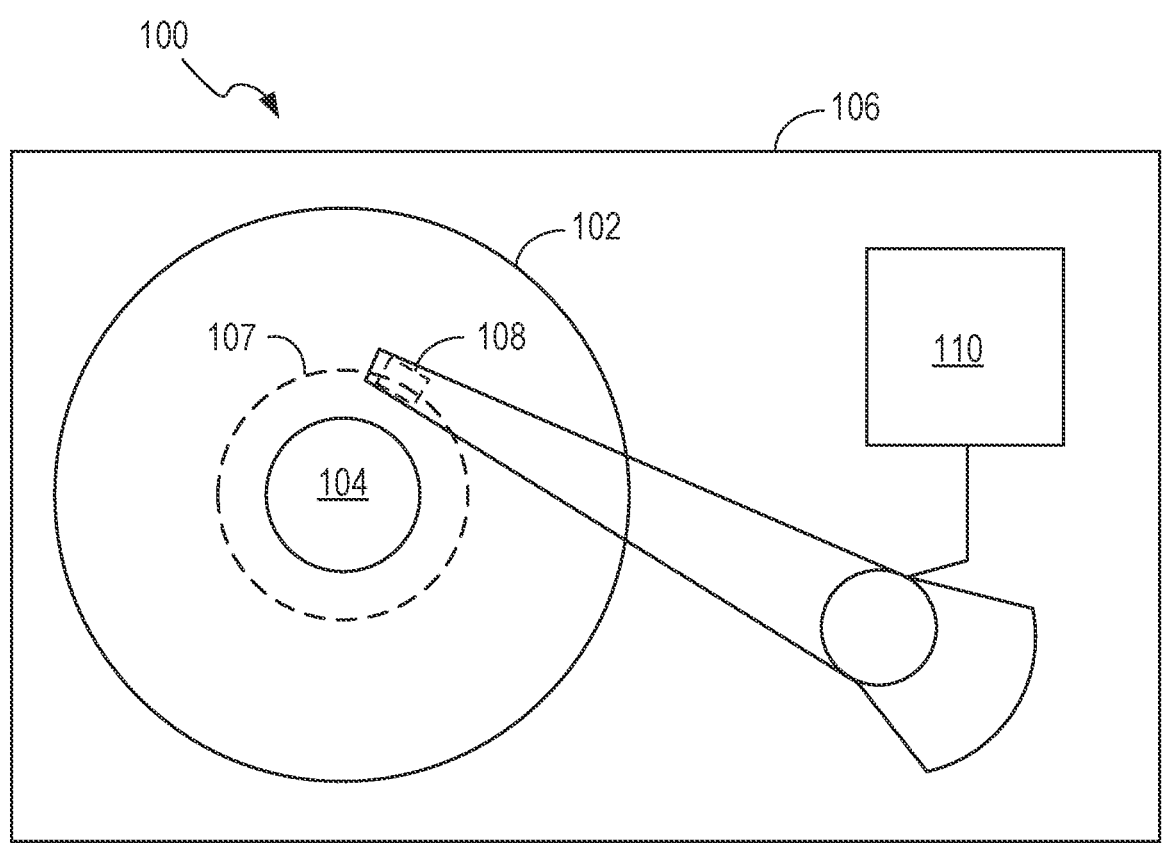
FIG. 1A illustrates a top plan view of a data storage device including a disk shaped magnetic recording medium (magnetic recording disk) in accordance with some aspects.

FIG. 1A is a top schematic view of a data storage device 100 configured for magnetic recording and including a disk shaped magnetic recording medium 102 in accordance with some aspects of the disclosure. In illustrative examples, the magnetic recording medium 102 is configured for perpendicular magnetic recording (PMR). However, other recording media, such as media configured for heat assisted magnetic recording (HAMR) or microwave assisted magnetic recording (MAMR) may be used in other examples. The magnetic storage device 100 may include one or more disks/media 102 to store data. Disk/media 102 resides on a spindle assembly 104 that is mounted to drive housing 106. Data may be stored along tracks 107 along the magnetic recording layer of disk 102. The reading and writing of data are accomplished with the head/slider 108 that may have both read and write elements. The write element is used to alter the properties of the magnetic recording layer of disk 102 and thereby write information thereto. In one embodiment, recording head 108 may have magneto-resistive (MR), or giant magneto-resistive (GMR) elements, such as tunnel magneto-resistive (TMR) elements for reading, and a write pole with coils that can be energized for writing. In another embodiment, head 108 may be another type of head, for example, an inductive read/write head or a Hall effect head. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110.

Figure 1B:
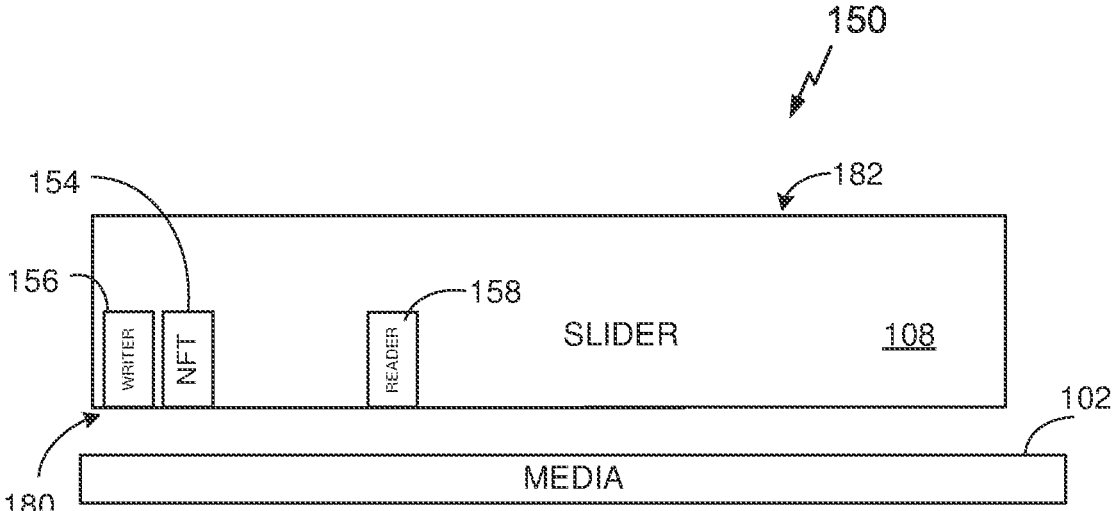
FIG. 1B illustrates a profile view of a slider and the magnetic recording medium of FIG. 1A in accordance with some aspects.

FIG. 1B illustrates a profile view of the slider 108 and the magnetic recording medium 102 of FIG. 1A in accordance with some aspects of the disclosure. In particular, FIG. 1B illustrates an assembly 150 that includes the slider 108, a near-field transducer (NFT) 154 (if the head is configured for heat assisted magnetic recording (HAMR)), a writer 156 and a reader 158. It is noted that FIG. 1B is not drawn to scale and generally the slider 108 is substantially smaller than the media 102 (e.g., as shown in FIG. 1A). The NFT 154 may be omitted in a non-HAMR slider, and other components may be used instead in other types of energy assisted recording technology (e.g., a spin torque oscillator (STO) in a microwave assisted magnetic recording (MAMR) head). The assembly 150 may further include a laser (not shown) configured to direct light energy to the NFT 154 during a writing process, wherein the NFT may generate localized heat energy, in response to the light energy, to assist the writing process. The laser may be mounted to or made integral to the slider 108. If the slider 108 is not configured for HAMR (e.g., is configured for non-HAMR applications), the laser and NFT may be omitted. The assembly 150 is positioned over the media 102. The slider 108 may be one component or several components. The slider 108 may include a slider body and a slider head. In some implementations, a slider head may be a separate component that may be integrated with the slider 108. The NFT 154, the writer 156 and the reader 158 may be implemented in the slider, the slider head or combinations thereof.

The slider 108 includes a first surface 180 (e.g., bottom surface) that faces the media 102. The first surface 180 may be referred to as an air bearing surface (ABS). The slider 108 also includes a second surface 182 (e.g., top surface) that faces away from the media 102. The NFT 154, the writer 156 and the reader 158 may be located near or along the first surface 180 of the slider 108. The writer 156 may be a writing element (e.g., means for writing data) for writing data on the media 102, and the reader 158 may be a reading element (e.g., means for reading data) for reading data on the media 102. The writer 156 may include a write pole.

Figure 2:
FIG. 2 is an example diagram illustrating fabrication of glass substrate disks from a glass sheet that are configured to be further processed to form magnetic recording disks in accordance with some aspects.
Figure 2:
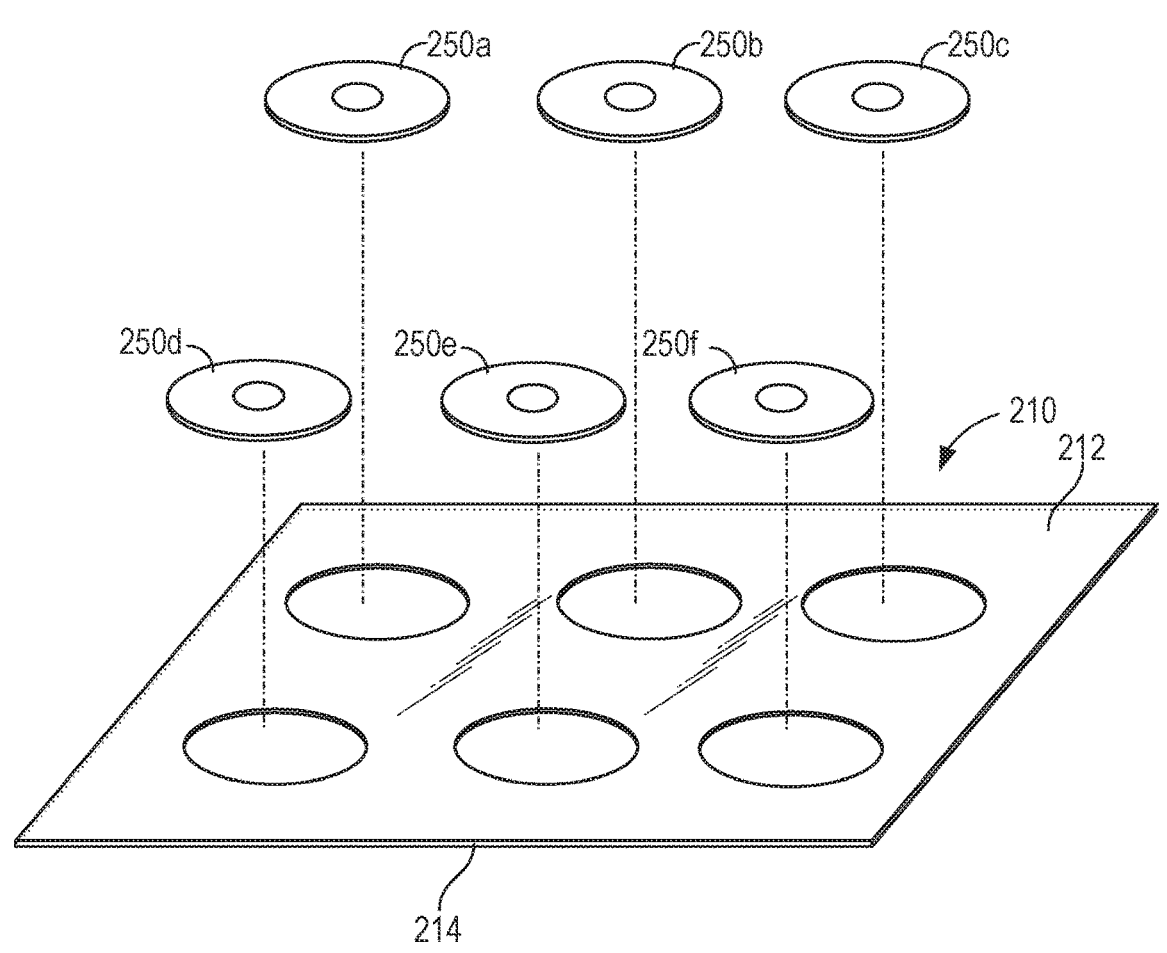

FIG. 2 is an example diagram illustrating fabrication of glass substrate disks from a glass sheet that are configured to be further processed to form magnetic recording disks in accordance with some aspects. To manufacture a magnetic recording disk such as the disk 102 of FIG. 1A, a glass sheet may be cut into multiple glass substrate disks, and the glass substrate disks may be further processed to form magnetic recording disks (e.g., using one or more deposition processes wherein at least one magnetic recording layer is added). As shown in FIG. 2, for example, a glass sheet 210 with a first surface 212 and a second surface 214 are cut into glass substrate disks 230a, 230b, 230c, 230d, 230e, and 230f, which are then processed to form magnetic recording disks (e.g., after undergoing further cutting and various deposition steps). In some examples, the glass sheet may be divided into multiple regions from which multiple glass substrate disks for magnetic recording disks are cut. In the example illustrated in FIG. 2, the glass sheet 210 is divided into six regions, and the glass substrates 230a, 230b, 230c, 230d, 230e, and 230f are cut from the six regions, respectively. In other examples, the glass sheet may be divided into less than or greater than six regions depending on the size of the glass substrates desired and the size of the glass sheet.

A glass sheet is generally an unfinished sheet of glass that may have foreign substances, defects, and/or roughness. Glass substrate disks for the magnetic recording disks generally require a smooth surface with few or no defects. Therefore, after cutting the glass sheet into glass substrate disks, multiple polishing steps and/or a lapping process may be applied to each glass substrate disk to achieve the desired smoothness in the surface and/or to adjust a thickness of the glass substrate.

Figures 3A, 3B:
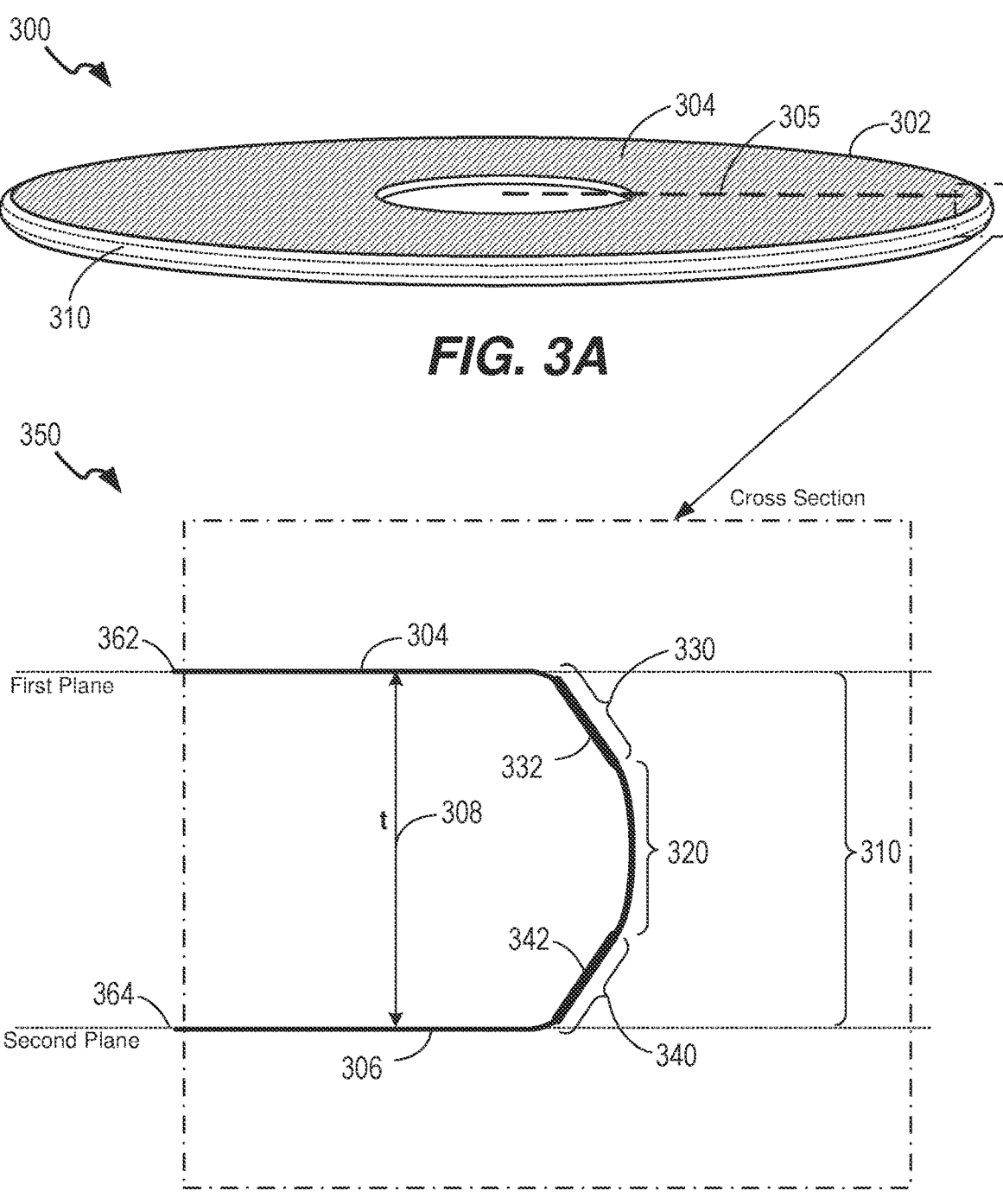
FIGS. 3A and 3B illustrate example diagrams showing a disk and a cross section of a portion near an outer diameter (OD) edge of the disk, according to some aspects.

FIGS. 3A and 3B illustrate example diagrams showing a substrate disk and a cross section of a portion near an OD edge of the substrate disk, according to some aspects. FIG. 3A illustrates an exemplary diagram 300 showing a substrate disk 302 for magnetic recording. FIG. 3B illustrates an example diagram 350 of a cross section of a portion near an OD edge of the substrate disk 302. The cross section shown in FIG. 3 may be taken along a plane perpendicular to a first surface 304 and along a radial line 305 of the substrate disk 302. The substrate disk 302, which may be configured for magnetic recording, may have the first surface 304 extending along a first plane 362 and a second surface 306 extending along a second plane 364 parallel to the first plane 362. The first surface 304 may be a data surface where data may be magnetically recorded in a magnetic recording layer of the substrate disk 302 (e.g., once it has been deposited). For example, the data may be recorded in the magnetic recording layer of the substrate disk 302 using a recording head (e.g., recording head 108). The substrate disk 302 may further have an OD edge 310 along a perimeter edge of the substrate disk 302. The OD edge 310 of the substrate disk 302 may include an edge surface 320, a first chamfer 330, and a second chamfer 340. The edge surface 320 is disposed along a perimeter of the substrate disk 302 and between the first surface 304 and the second surface 306. The first chamfer 330 is disposed between the first surface 304 and the edge surface 320, and the second chamfer 340 is disposed between the second surface 306 and the edge surface 320. A disk thickness (t) 308 is the thickness between the first surface 304 and the second surface 306, and may be measured along a direction substantially normal to the first surface 304 or the second surface 306. In some aspects, the disk thickness may be less than or equal to 0.5 mm.

An OD edge region is a region at or around an OD edge and includes the outer end of the data surface of a substrate disk, a first chamfer that is disposed at the end of the data surface. And an edge surface that is disposed at the other end of the first chamfer. For example, as shown in FIGS. 3A and 3B, in an OD edge region, the outer end of the first surface 304 being the data surface of the substrate disk 302 extends to the first chamfer 330 and the first chamfer 330 extends to the edge surface 320, where the data surface is used to record data. Because natural pressure variations may exist in the OD edge region at or around the OD edge, the polishing process may cause height variations in the OD edge region.

Figure 4:
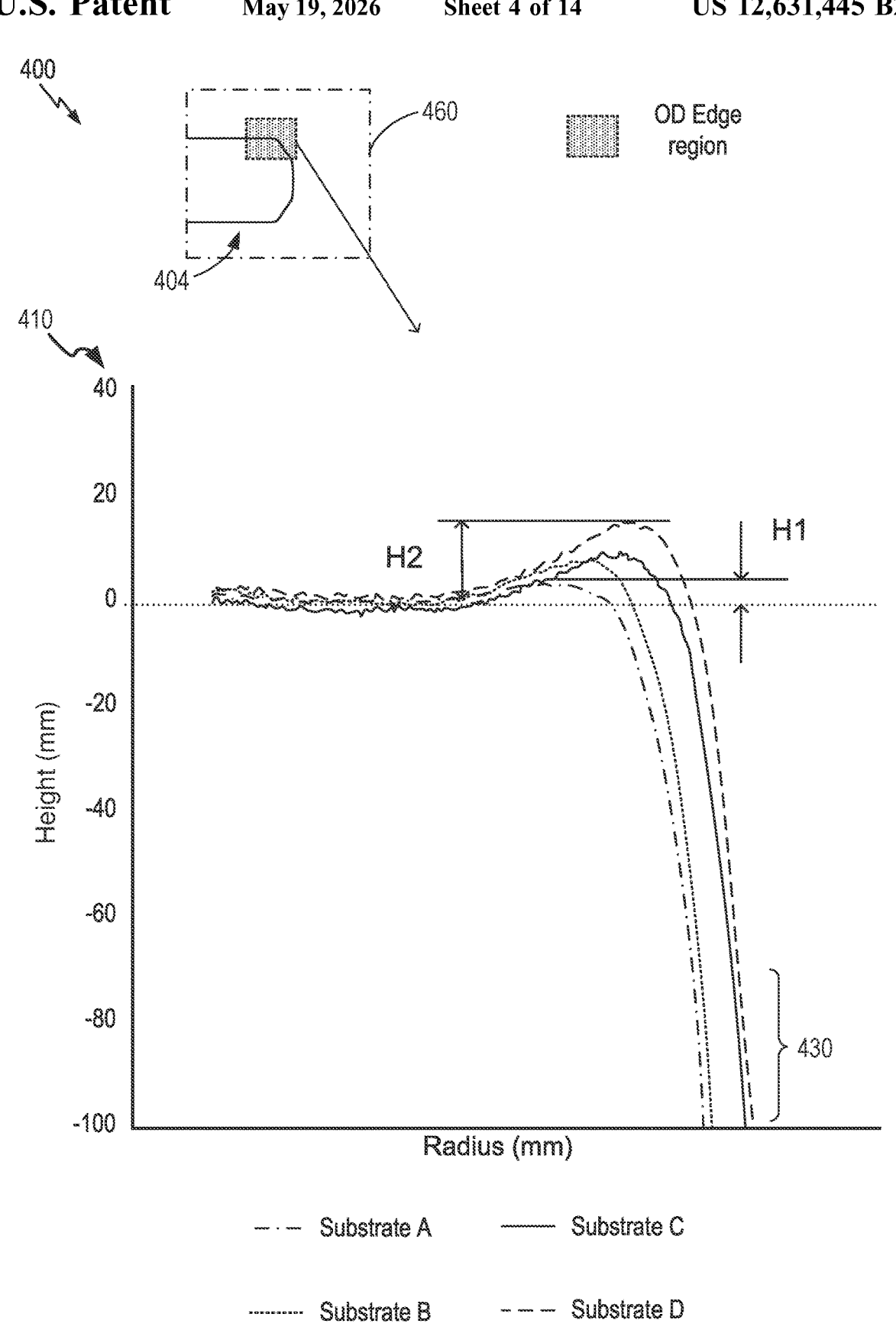
FIG. 4 is an example diagram showing OD profiles of different substrates at respective OD edge regions, according to some aspects.

FIG. 4 is an example diagram 400 showing OD profiles of substrates at respective OD edge regions, according to some aspects. Each profile in FIG. 4 shows height values along a top surface of a substrate at various radial distances from the center of the substrate. In FIG. 4, each of the OD profiles shown in an OD profile plot 410 corresponds to an OD edge region as shown in a cross-section view 460 of a respective substrate disk 404. The cross-section view 460 may correspond to the cross section diagram 350 shown in FIG. 3B.

In the example shown in FIG. 4, the OD profile of the Substrate A and the OD profile of the Substrate B have roll-off regions between a data surface and a chamfer region 430, where the roll-off regions show a gradual roll off from the data surface to the chamfer region 430. On the other hand, the OD profile of the Substrate C and the OD profile of the Substrate D have ski-jump regions between the data surface and the chamfer region 430, where the height drastically increases between the data surface and the chamfer region 430 before dropping at the chamfer region 430. One way to quantify such deviations is to measure the height differences (e.g., H1, H2) between the data surface and a certain point at the OD edge region. For example, the height difference may be determined by taking a height difference between a baseline point (e.g., at 0) and the highest point before reaching the chamfer region 430, where the baseline point is a height at the data surface of the substrate. For example, the height difference for Substrate A is shown as H1 and the height difference for Substrate D is shown as H2, which is greater than H1. Hence, in this example. Substrate D has a greater height deviation than Substrate A. As discussed above, this height difference, taken over a surface of the substrate, may be used to determine whether the substrate is sufficiently flat to be used for magnetic recording.

Figures 5A, 5B, 5C:
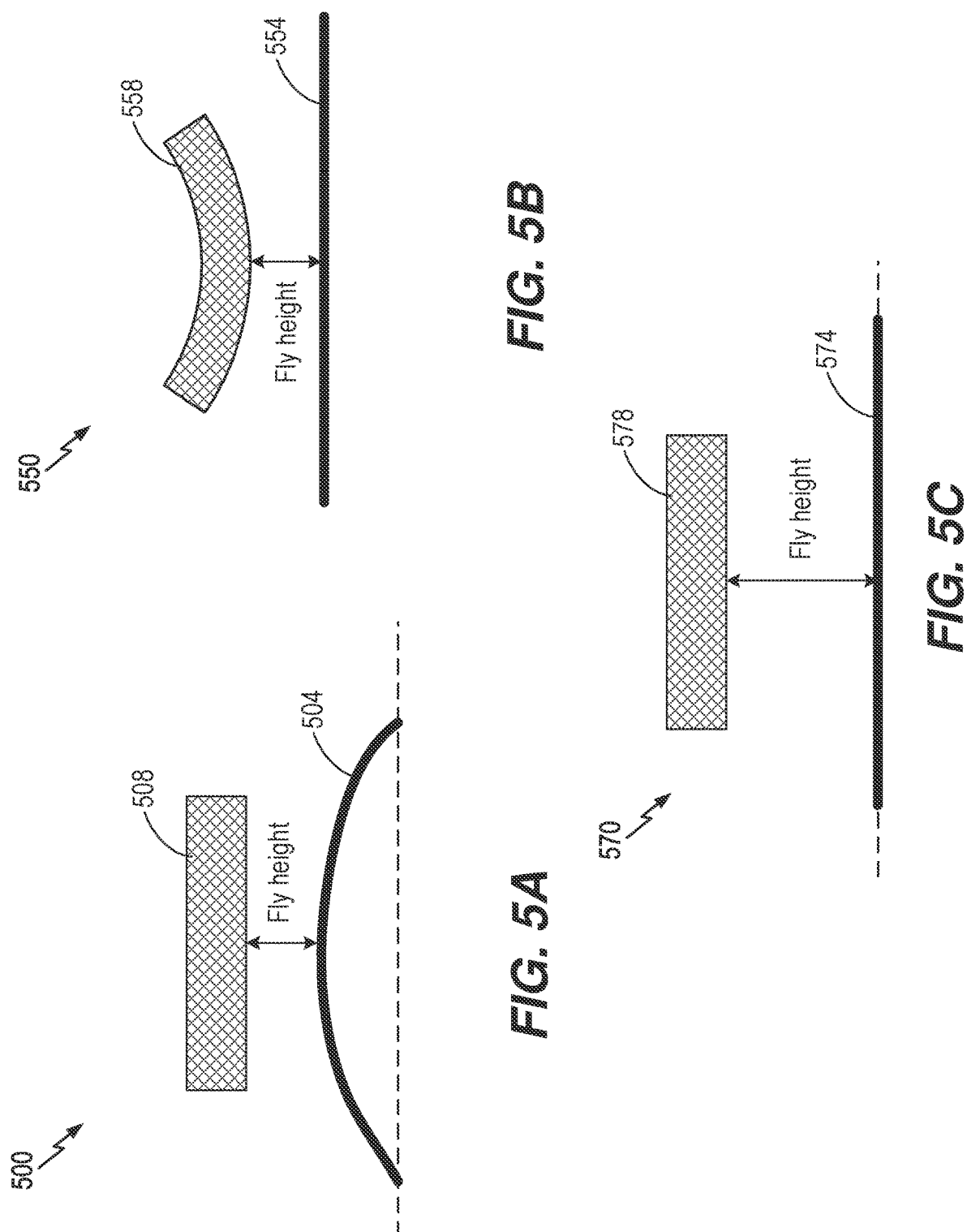
FIG. 5A is an example diagram illustrating fly height deviations in a case where a surface of a substrate is curved, according to some aspects.
FIG. 5B is an example diagram illustrating fly height deviations a case where a surface of a slider is curved, according to some aspects.
FIG. 5C is an example diagram illustrating fly height with no curve on the disk surface and a flat head surface of the slider, according to some aspects.

FIG. 5A is an example diagram 500 illustrating fly height (e.g., flying height) deviations in a case where a surface of a substrate is curved, according to some aspects. FIG. 5B is an example diagram 550 illustrating fly height deviations in a case where a surface of a slider is curved, according to some aspects. The fly height deviations on the surface of the substrate disk as mentioned above affect formation of air pressure between the disk surface and the head/slider (e.g., slider air bearing surface). As shown in FIG. 5A, due to fly height variations on the disk surface, a cross-section of a disk shows a curved disk surface 504 that is curved in a direction extending above the data surface of the substrate disk, while a head surface of a slider 508 is flat. The curved disk surface 504 read by the slider 508 with the flat head surface shown in FIG. 5A is equivalent to a flat disk surface 554 of FIG. 5B read by a cambered head surface of a slider 558. For example, the spacing between the curved disk surface 504 and the flat head surface of the slider 508 is equivalent to the spacing between the flat disk surface 554 and the cambered head surface of the slider 558. The fly height variations causing a curved disk surface such as the curved disk surface 504 cause a curvature effect, where the pressure of the compressed air between the disk surface and the head surface of the slider varies due to the curves/height variations. The spacing, which may also be referred to as a fly height or flying height, decreases when the disk surface 504 is curved or when the head surface of the slider 558 is cambered.

FIG. 5C is an example diagram 570 illustrating no curve on the disk surface 574 and a flat head surface of the slider 578, according to some aspects. As shown in FIG. 5C, when the disk surface 574 is flat without fly height variations and the head surface of the slider 578 is flat, the spacing between the disk surface 574 and the head surface of the slider 578 remains constant and does not change as in the examples of FIGS. 5A and 5B.

The fly height (e.g., flying height) can be measured based on a touch down (TD) velocity and/or a heater power. The TD velocity is the velocity (e.g., revolution per minute (RPM)) at which the disk spins when the slider touches the disk surface. The cambered head surface of the slider 558 as shown in FIG. 5B causes cambered air bearing that generates less air pressure than the flat head surface of the slider 578 as shown in FIG. 5C. Hence, a disk spin speed (RPM) needs to be higher for the cambered head surface to maintain the same fly height. If the disk spin speed is reduced from a higher RPM, at which a head surface of a slider flies without contacting the disk surface, to a lower RPM, the head surface starts contacting the disk surface. Because the cambered air bearing generates less pressure, the contact (touch down) happens at a higher RPM. Therefore, the TD velocity is higher for a case where the disk surface is curved (e.g., FIG. 5A or 5B) than a case where the disk surface is flat without fly height variations (e.g., FIG. 5C). The difference between the TD velocity for the flat disk surface and the TD velocity with the curved velocity may indicate a degree of curvature of the disk surface is, and thus may show the effect of the roll off. Therefore, by measuring the TD velocity, the fly height can be estimated.

If heater power is used to measure the fly height, a read/write element in a pole tip area of a head (within the slider) can be extended toward the disk surface by thermally protruding the pole tip. The amount of protrusion of the pole tip can be controlled by controlling a power applied to a heater positioned in the pole tip area. For example, if X watts of power applied to the heater is needed to cause the pole tip to protrude enough to contact the disk surface in a case where the disk surface is flat without fly height variations (e.g., FIG. 5C), X minus Y watts applied to the heater may be sufficient to cause the pole tip to protrude enough to contact the disk surface in a case where the disk surface is curved (e.g., FIG. 5A or 5B) because the head surface of the slider is closer to the disk surface in such a case. The value Y may indicate a degree of curvature of the disk surface.

If the degree of curvature on the disk surface increases, the spacing/fly height decreases. With the decreased spacing/fly height, undesired contact between the head surface of the slider and the disk surface may occur frequently, which negatively affects the reliability of the disk and/or the slider. The degree of the curvature on the disk surface may be expressed as an extreme radial curvature at extended position (XRCE) value indicating a roll-off value at a particular radius, where the XRCE is a difference between a baseline point on the surface and the measured height on the surface and the baseline point is a height at the data surface of the substrate. As the XRCE value increases, the TD velocity increases because curves and/or roll-offs degrade the air bearing capability of the slider, requiring a higher TD velocity. Hence, by measuring the TD velocity, the XRCE value and the fly height may be estimated. Generally speaking, from the disk inner diameter (ID) and toward the OD, a higher TD velocity is measured, which means that a higher XRCE value or a lower flight height is Height estimated toward the OD. With the higher XRCE value toward the OD, the slider read performance deteriorates toward the OD.

Height variations within a small region such as an OD edge region may affect the disk read operations performed by the slider. Generally, the slider is able to move up and down to some degree to compensate for gradual minor height variations along the surface of the disk. For example, the slider may be supported by an elastic mechanism such as a spring beam, which allows some movement of the slider with a suspension effect. At least for this reason, gradual minor changes in the height along the surface of the disk may not adversely affect the slider's performance as the slider can move up and down to some degree to adapt to the gradual changes. However, there is a limit at which the slider can adapt. For example, if the disk surface has too much curvature, then the slider may not be able to adapt to the reduced fly height due to the curvature. Further, local height variations under the slider may affect the performance of the slider. For example, physical contact between the slider and the disk surface may occur if there is a drastic height variation causing local height variations within a small area. Continuous or frequent contacts that are undesired between the slider and the disk surface may occur due to local height variations, especially near the OD. During a glide test of a disk, a head with contact sensors for the test is flown over a disk surface to find a contact between any defect on the disk surface and the head. Near the OD, the head during the test may contact the disk surface due to the curvature effects even if there is no defect on the disk surface. If this happens, the memory for storing the contact information about the contact between the disk surface and the head can saturate. Hence, such undesired contacts may be referred to as overflows.

For example, referring back to FIG. 4, it may appear that a substrate with the height variation of H1 is a more acceptable substrate than a substrate with the height variation of H2. However, the height variations H1 and H2 are determined based on the average data on the height variations of the disk surface, which may not accurately indicate fly height changes. For example, in some cases, a first substrate with the height variation of H1 may have more drastic height variations within the OD edge region than a second substrate with the height variation of H2 greater than H1. In such cases, the first substrate with the more drastic local height variations within the OD edge region may be less acceptable than the second substrate, although the second substrate may have a higher overall height variation than the first substrate. Therefore, an approach to consider an OD profile based on the above factors is desired to define a usable data surface. In particular, it may be beneficial to consider local height variations within small regions on the surface of the substrate. For example, local height variations in the radial direction may be beneficial in that determination of the local height variations is not affected by the suspension effect of the slider.

According to some aspects of the disclosure, an approach for identifying a substrate suitable for use within a magnetic medium of a data storage device configured for magnetic recording is provided. One approach to quantify an OD profile considers a local profile of a substrate on a disk surface of the substrate based on dimension(s) of a slider of the data storage device to be used in conjunction with the magnetic medium. In an aspect, the dimension(s) of the slider are identified, and then a measurement length and a localized height threshold are determined based on the dimension(s) of the slider. Then, localized height values of the substrate at various distances from a center of the substrate are measured, where each of the localized height values is measured within the measurement length and at one of the various distances. Subsequently, the localized height values and the localized height threshold are compared, and based on this comparison, determination as to whether to utilize the substrate for the magnetic medium is made.

Figure 6:
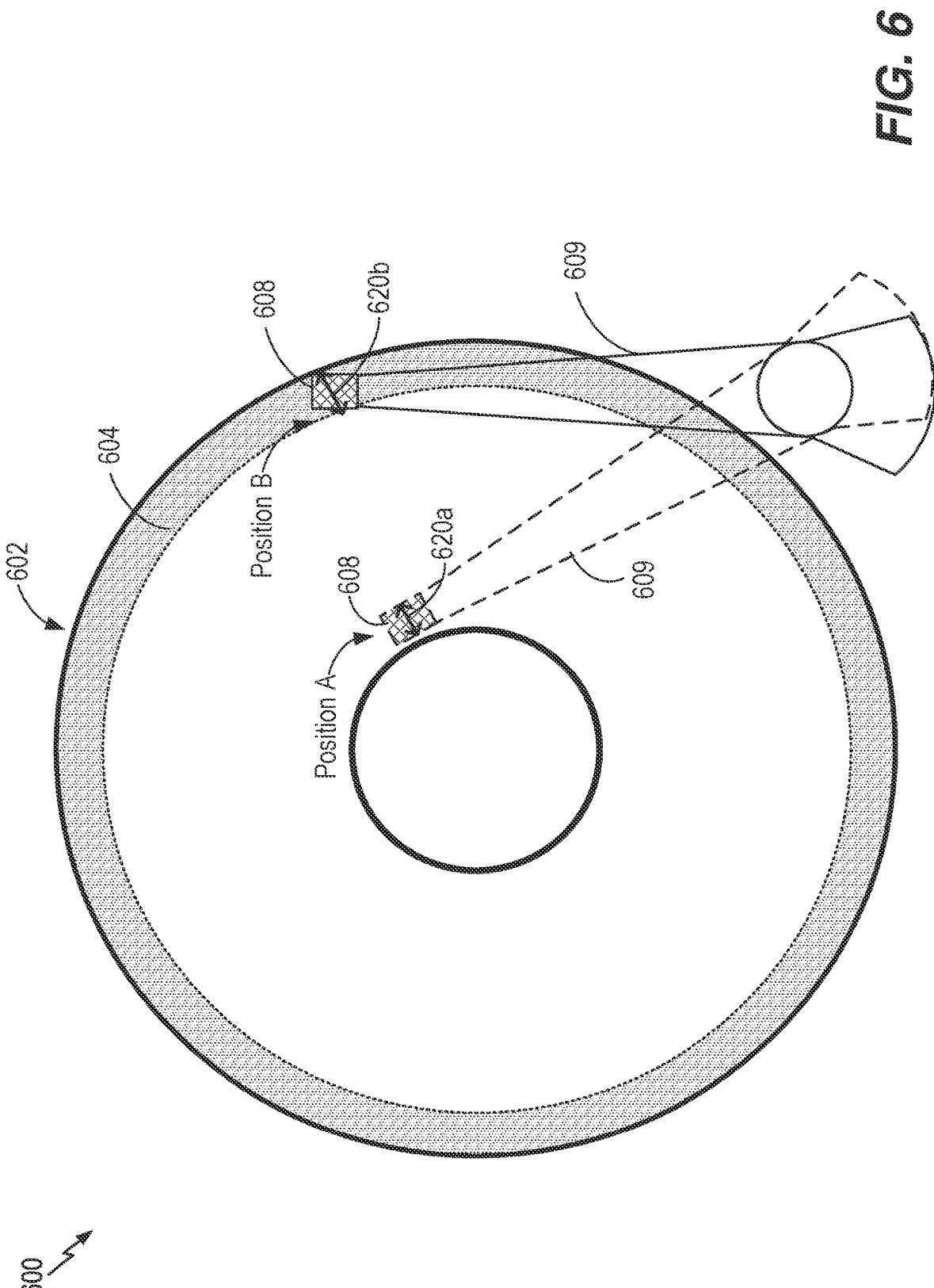
FIG. 6 is an example diagram illustrating measurement lengths at different portions of a disk substrate, according to some aspects.

FIG. 6 illustrates an example diagram 600 illustrating measurement lengths at different portions of a disk substrate, according to some aspects. FIG. 6 shows a top view of a disk substrate 602 and a slider 608 positioned at the end of a suspension 609 and above the substrate 602 at multiple positions. As shown in FIG. 6A, the disk substrate 602 has an OD edge region 604 near an OD of the disk substrate 602. When the slider 608 is at Position A near an ID of the disk substrate 602, a measurement line that is a straight line toward a center of the disk substrate 602 (e.g., a line or length across the slider body which is normal to the circular tracks extending along the disk, where this line/length will be parallel with a radial line of the substrate) is parallel or substantially parallel to a width of the slider 608 and has the same or substantially the same linear length as the width of the slider 608. In such case, the measurement line at Position A may be equal to or substantially equal to the width of the slider 608. On the other hand, when the slider 608 is at the OD edge region 604 (e.g., near the OD), the measurement line (e.g., that is a straight line toward the center of the disk substrate 602) is at an angle from a line in the width direction of the slider 608. Hence, a length of the measurement line varies depending on a position of the slider 608 (e.g., distance from the center of the disk substrate 602). However, if the measurements are made in various positions in the OD edge region 604, the length of the measurement line may tend to have very small or negligible variation. This is because the change in position of the slider 608 within the OD edge region 608 for different slider positions (e.g., to read or write different tracks) is not large enough to vary the length of the measurement line significantly. Therefore, in some aspects, a single length may be used for the measurement lines for measurements made at various positions near the OD, e.g., within the OD edge region 604.

In another aspect, instead of using the single length, multiple measurement lengths may be determined for various slider positions. As a result, multiple localized height thresholds may be generated from the multiple measurement lengths. In this aspect, each of the localized height values is measured within a respective one of the multiple measurement lengths and at one of the various radial distances, and the multiple localized height values are compared with the multiple localized height thresholds, respectively. In one aspect, each of the multiple localized height values is compared with a respective one of the multiple localized height values.

In an aspect, the localized height values are measured along multiple measurement lines on a surface of the substrate, where each of the multiple measurement lines is a straight line directed toward the center of the substrate and has a length equal to the measurement length. For example, as shown in FIG. 6, the measurement line 620b is a straight line directed toward a center of the disk substrate 602. Unlike the measurement line 620a at Position A near an ID, the measurement line 620b in the OD edge region 604 is skewed relative to the width of the slider 608. In an example, if localized height values are measured along multiple measurement lines within the OD edge region 608, each of the multiple measurement lines may have a length equal to the measurement length.

In an aspect, each of the localized height values is measured based on a difference between a highest point and a lowest point on the surface of the substrate along a respective measurement line of the plurality of measurement lines. In an example, the highest point and the lowest point on the surface of the substrate along the respective measurement line may be determined based TD velocities or another common measurement method for measuring a height on a surface (e.g., using an optical interferometry or a surface profiler).

Figure 7A:
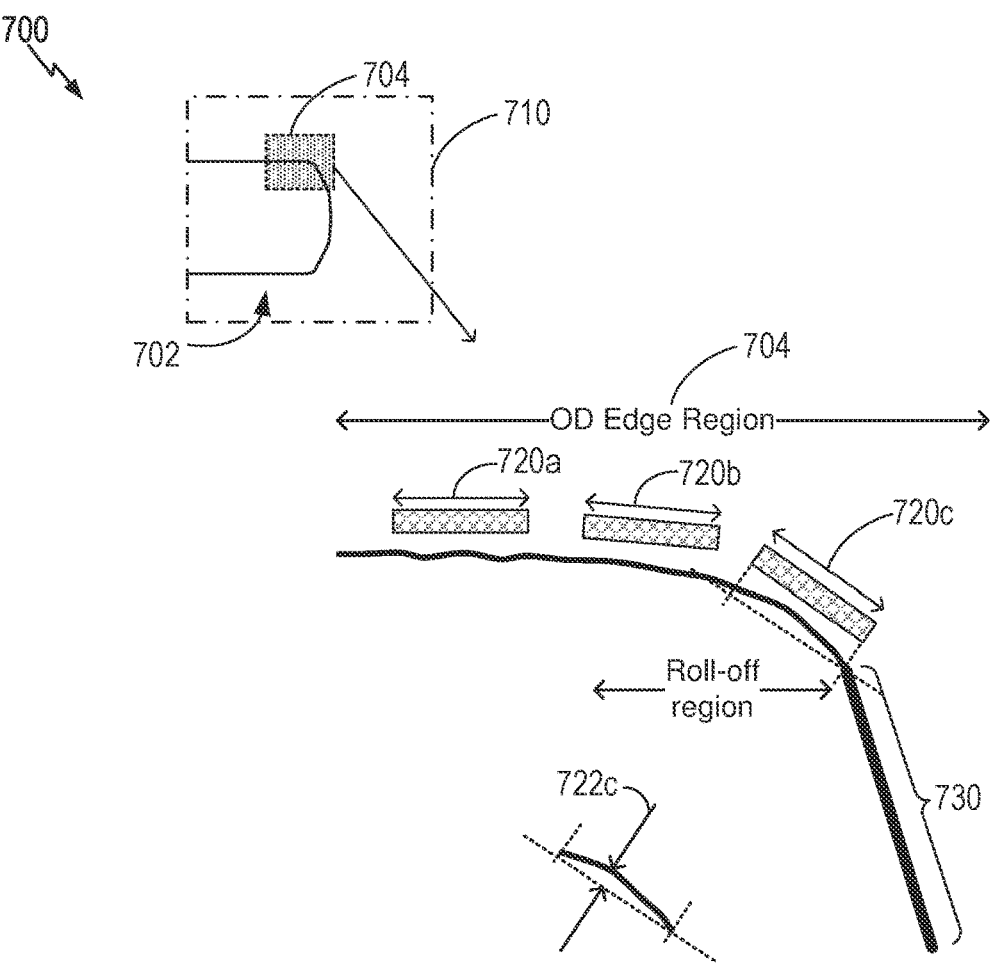
FIGS. 7A and 7B are example diagrams illustrating measurements of localized height values of the substrate at various distances from a center of the substrate at an OD edge region, according to some aspects.
Figure 7B:
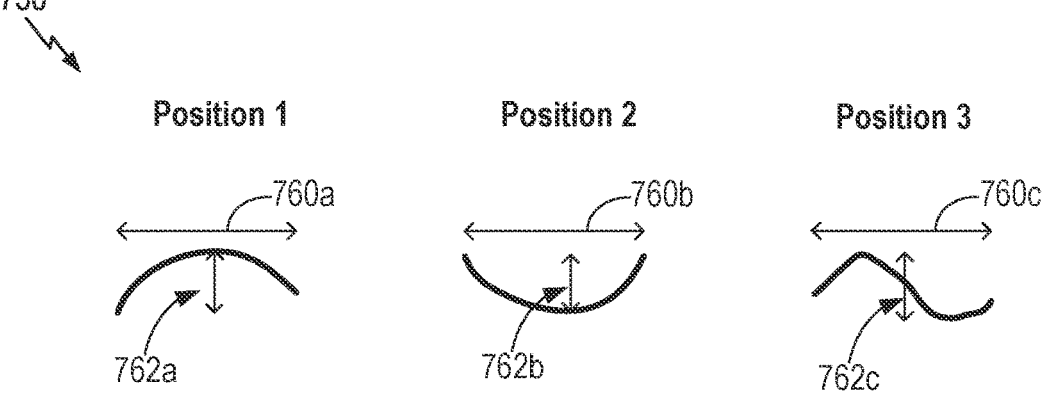

FIGS. 7A and 7B are example diagrams illustrating measurements of localized height values of the substrate at various distances from a center of the substrate at an OD edge region, according to some aspects. FIG. 7A is an example diagram 700 illustrating measurements of the localized height values of a substrate 702 along multiple measurement lines at an OD edge region of the substrate 702. FIG. 7A shows a cross section view 710 of a portion of the substrate 702 near an OD of the substrate. For example, the cross section view 710 of FIG. 7A may correspond to the example diagram 350 of the cross section in FIG. 3. In FIG. 7A, the measurements of the localized height values are made in the OD edge region 704 of the substrate 702. For example, the OD edge region 704 of the substrate 702 of FIG. 7A may correspond to the OD edge region 604 of the disk substrate 602 of FIG. 6. In FIG. 7A, the measurements of the localized height values are made along the measurement lines 720a, 720b, and 720c on the surface of the substrate 702 at three respective distances from the center of the substrate, where each of the measurement lines 720a, 720b, and 720c is a straight line directed toward the center of the substrate and has a length equal to the measurement length. In one example when the measurement is made within the measurement line 720c, a localized height value 722c of the substrate measured within the measurement line 720c at this particular distance away from the center of the substrate is a difference between a highest point and a lowest point along the measurement line 720c.

FIG. 7B is an example diagram 750 showing different examples of measuring localized height values of the substrate at three different positions. In FIG. 7B, at Position 1, a first localized height value 762a that is measured within a first measurement length 760a is a difference between a highest point and a lowest point on the surface of the substrate along the first measurement line 760a. At Position 2, a second localized height value 762b that is measured within a second measurement length 760b is a difference between a highest point and a lowest point on the surface of the substrate along the first measurement line 760b. At Position 3, a second localized height value 762c that is measured within a second measurement length 760c is a difference between a highest point and a lowest point on the surface of the substrate along the first measurement line 760c.

In some aspects, the localized height threshold is determined based on the measurement length, where the measurement length is the width of the slider body (in a radial direction of the disk) that will cross the data tracks at a given slider position over the disk. Thus, the measurement length is based on a length and a width of the slider ABS and is further based on a skew angle of the ABS at a particular slider position along the suspension determined slider track (e.g., that extends from Position A to Position B in FIG. 6). Here, the skew angle is the angle formed between a line parallel to the length of the ABS and a data track on the magnetic medium. In this aspect, the measurement length is a sum of the length of the ABS multiplied by a sine value of the skew angle and the width of the ABS multiplied by a cosine value of the skew angle. Further, in an aspect, the localized height threshold is 500 nanometers multiplied by a square of the measurement length, or stated another way, the localized height threshold is 500 nanometers multiplied by the measurement length multiplied by the measurement length.

Figure 8B:
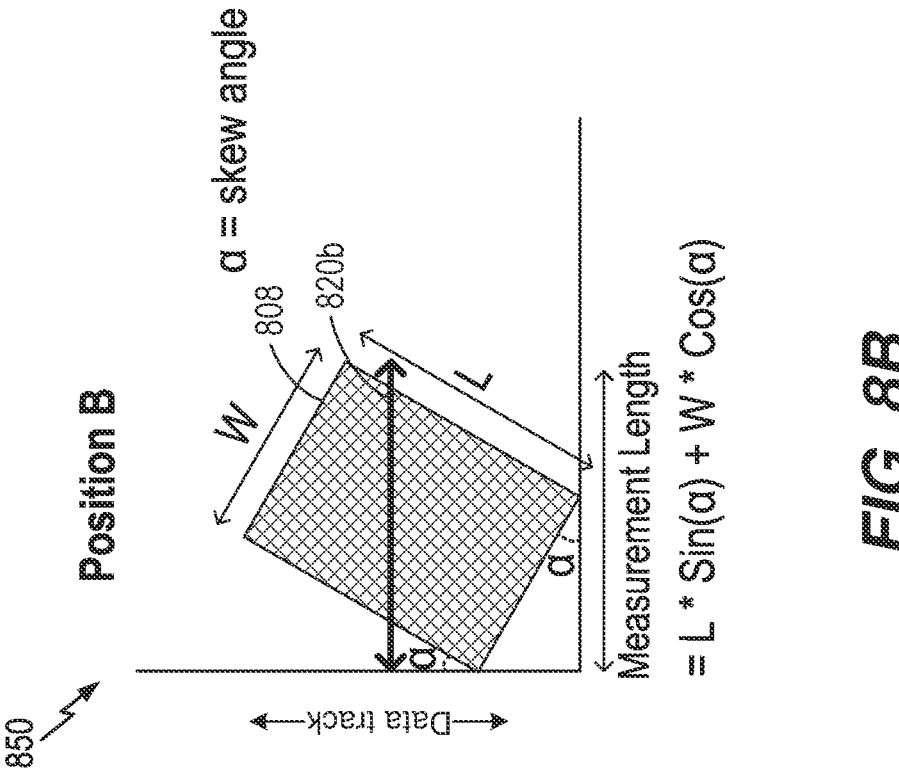
FIGS. 8A and 8B are example diagrams illustrating measurement lengths at two different positions, according to some aspects.
Figure 8A:
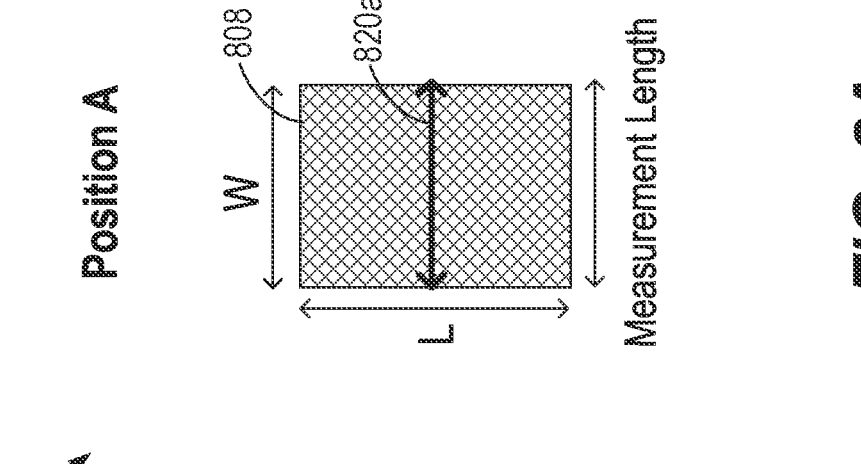

FIGS. 8A and 8B are example diagrams illustrating a slider and corresponding measurement lengths at two different positions, according to some aspects. In an example, FIG. 8A may illustrate the measurement length at Position A of FIG. 6 and FIG. 8B may illustrate the measurement length at Position B of FIG. 6. As shown in FIGS. 8A and 8B, the slider 808 (e.g., of a magnetic storage device) has a rectangular surface (e.g., ABS) with a length L and a width W. FIG. 8A is an example diagram 800 illustrating a measurement length (e.g., of a measurement line taken across the effective width of the slider 808) at a position near an ID of a substrate. As explained above in reference to FIG. 6, when the slider 808 of the magnetic storage device is positioned near an ID at Position A, a measurement line 820*a* being a straight line directed toward the center of the substrate has a measurement length being the same as the width of the slider 808 (e.g., the effective width of the slider 808 over the data tracks is effectively the same as the width of the slider ABS).

FIG. 8B is an example diagram 850 illustrating a slider and a corresponding measurement length at a position in an OD edge region of the substrate. As explained above in reference to FIG. 6, when the slider 808 is in the OD edge region near an OD edge of the substrate, the measurement line 820*b* being a straight line directed toward the center of the substrate is skewed relative to the width of the slider 808 (e.g., such that the effective width of the slider 808 is not equal to the slider width). In particular, because the slider 808 is skewed with respect to data tracks (e.g., extending in a vertical direction in FIGS. 8A and 8B), the length of the measurement line 820*b* (e.g., measurement length of the slider at Position B) is based on the length and the width of the slider 808 as well as the skew angle α of the rectangular surface of the slider 808, where the skew angle α is an angle between a line parallel to the length of the slider 808 and a direction of a data track on the magnetic medium (e.g., the data track extending in a vertical direction perpendicular to the measurement line 820*b*). For example, the measurement length of the measurement line 820*b* may be calculated using the following equation:

$$\text{Measurement Length} = L * \text{Sin}(\alpha) + W * \text{Cos}(\alpha), \quad (1)$$

where L is the length of the slider 808, W is the width of the slider 808, and α is the skew angle.

In some examples, the localized height threshold can be determined by multiplying 500 nanometers (nm) by a square of a ratio of the width of the slider to the measurement length as follows, where the localized height threshold may indicate an acceptable localized height.

$$\text{Localized Height Threshold} = 500 \text{ nm} * (W/\text{Measurement Length})^2 \quad (2)$$

where W is the width of the slider 808, and the Measurement Length may be determined based on Equation (1) above.

Figure 9:
FIG. 9 is an example diagram illustrating a plot of localized height values as a function of a radial distance from a center of the substrate, according to some aspects.
Figure 9:
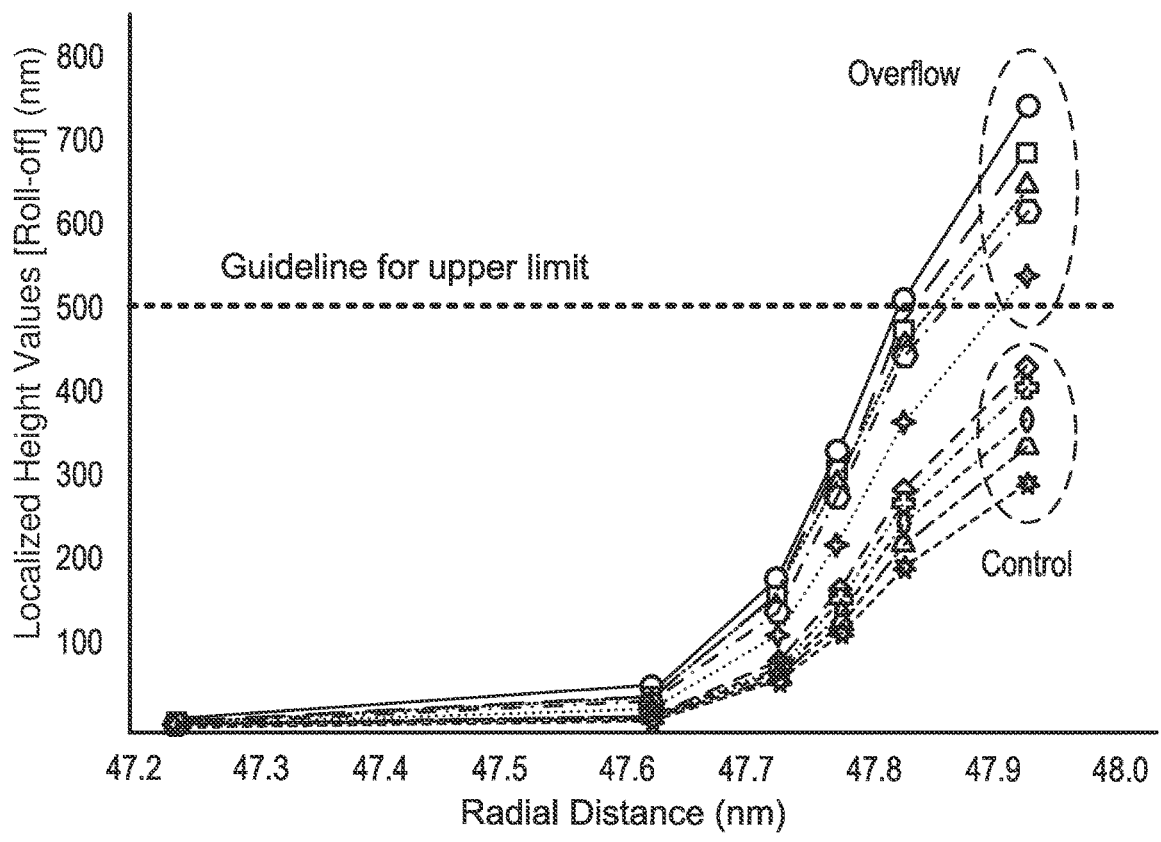

FIG. 9 is an example diagram 900 illustrating a plot of localized height values as a function of radial distances from a center of the substrate, according to some aspects. In FIG. 9, overflow samples 1A through 1E are from substrates experiencing undesirable height overflows in the OD edge region, while control samples 2A through 2E are from substrates that do not experience such height overflows in the OD edge region. The measurement length used to measure the localized height values in FIG. 9 is 1 mm. In more detail, and as shown in FIG. 9, the localized height values for the control samples 2A through 2E do not exceed 500 nm, while the localized height values for the overflow samples 1A through 1E exceed 500 nm (e.g., at some points as the radial distance from the center of the substrate increases). Hence, according to this experiment, 500 nm may be considered as a guideline for an upper limit for the localized height value when the measurement length is 1 mm.

Figure 10:
FIG. 10 show tables illustrating localized height thresholds for various measurement lengths, according to some aspects.

FIG. 10 show tables illustrating localized height thresholds for various measurement lengths, according to some aspects. In FIG. 10, a Femto head table 1000 shows different localized height thresholds (e.g., "Acceptable XRC (nm)) for different measurement lengths for a slider having or embodying a Femto head, where each measurement length is determined based on a width and a length of the slider and a skew angle. Further, in FIG. 10, a Pemto head table 1000 shows different localized height thresholds (e.g., "Acceptable XRC (nm)) for different measurement lengths for a slider having or embodying a Pemto head (e.g., larger than the Femto head), where each measurement length is determined based on a width and a length of the slider and a skew angle. A localized height threshold may be considered as a maximum acceptable localized height value. With 500 nm being the guideline for the upper limit, when the measurement lengths and respective localized height thresholds are considered, the localized height threshold is equal to 500 nm multiplied by a square of the measurement length, as shown above in Equation (2).

In some aspects, multiple different localized height thresholds may be used depending on the radial distance from the center of the substrate where the measurement is made. Hence, the multiple localized height thresholds may respectively correspond to multiple radial distance ranges from the center of the substrate. In this aspect, the multiple localized height thresholds may be determined based on the measurement length as well as the multiple radial distance ranges. In one example, a lower localized height threshold may be used for a radial distance range closer to the center of the substrate. In an example, the multiple radial distance ranges may include a first radial distance range corresponding to a data zone, a second radial distance range corresponding to a load/unload zone, and a third radial distance range corresponding to an emergency power off (EPO) zone. For example, in the data zone closer to the center of the substrate, a low localized height threshold is used because the local height variations in the data zone are generally low. Further, in the data zone, the read/write element in the pole tip area of the head may be controlled thermally to protrude toward the disk surface, and thus there may not be much space between the slider head and the disk surface. On the other hand, at the load/unload zone further away from the center of the substrate, the read/write element in the pole tip area of the head is controlled not to protrude toward the disk surface. Therefore, at this zone, there is more spacing between the slider head and the disk surface and thus a larger roll-off and a larger localized height threshold are acceptable in these regions. At the EPO zone further away from the center of the substrate than the load/unload zone, the largest roll-off and the largest located height threshold are acceptable because the slider head is far enough from the disk surface.

In some aspects, the multiple localized height values and the multiple localized height thresholds are compared, where each localized height value is compared with a respective one of the multiple localized height thresholds that corresponds to a respective radial distance range of the multiple radial distance ranges. For example, if a first localized height value is measured at the first radial distance range corresponding to the data zone, this first localized height value is compared with the first localized height threshold. In another example, if a second localized height value is measured at the second radial distance range corresponding to the load/unload zone, this second localized height value is compared with the second localized height threshold that is greater than the first localized height threshold. Based on the comparison, it can be determined whether to utilize the substrate for the magnetic recording medium.

In some aspects, the multiple radial distance ranges respectively correspond to multiple radial distance constants, where each of the multiple localized height thresholds is determined based on a respective radial distance constant of the multiple radial distance constants multiplied by a square of a ratio of the width of the rectangular surface of the slider to the measurement length. For example, the first radial distance range may correspond to a first radial distance constant, the second radial distance range may correspond to a second radial distance constant, and the third radial distance range may correspond to a third radial distance constant. In this example, the first localized height threshold is determined based on the first radial distance constant multiplied by a square of a ratio of the width of the rectangular surface of the slider to the measurement length. Similarly, the second localized height threshold is determined based on the second radial distance constant multiplied by a square of a ratio of the width of the rectangular surface of the slider to the measurement length. Similarly, the third localized height threshold is determined based on the third radial distance constant multiplied by a square of a ratio of the width of the rectangular surface of the slider to the measurement length. A radial distance constant corresponding to a radial distance range closer to the center of the substrate is less than another radial distance constant corresponding to another radial distance range further away from the center of the substrate.

For example, if the first radial distance constant, the second radial distance constant, and the third radial distance constant are C1, C2, and C3 where C1 is the smallest and C3 is the largest, the first localized height threshold, the second localized height threshold, and the third localized height threshold may be expressed as below. In an example, C1, C2, and C3 may be 15 nm, 250 nm, and 500 nm, respectively.

$$\text{Localized Height Threshold } 1 = C1 * (W/\text{Measurement Length})^2 \quad (3.1)$$

$$\text{Localized Height Threshold } 2 = C2 * (W/\text{Measurement Length})^2 \quad (3.2)$$

$$\text{Localized Height Threshold } 3 = C3 * (W/\text{Measurement Length})^2 \quad (3.3)$$

where W is the width of the slider 808, and the Measurement Length may be determined based on Equation (1) above.

Figures 11A, 11B:
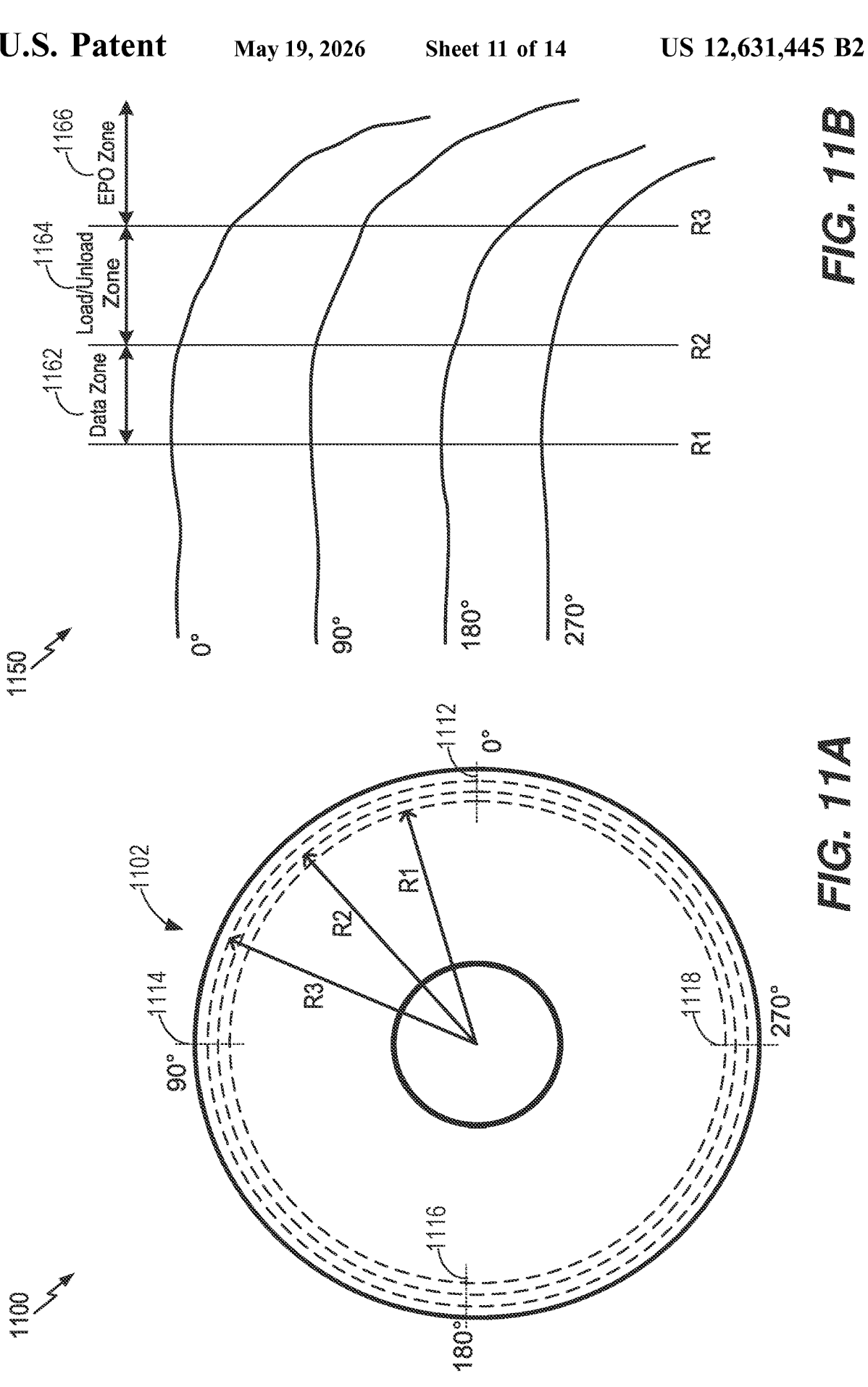
FIGS. 11A and 11B are example diagrams illustrating multiple radial distance ranges on a substrate, according to some aspects.

FIGS. 11A and 11B are example diagrams illustrating multiple radial distance ranges on a substrate, according to some aspects. FIG. 11A is an example diagram 1100 illustrating a substrate 1102 with three radial distance ranges, according to some aspects. In the example of FIG. 11A, three radial distances R1, R2, and R3 are illustrated. In an example, R1 may be 47.24 mm, R2 may be 47.62 mm, and R3 may be 47.92 mm. The first radial distance range ranges between R1 and R2, the second radial distance range ranges between R2 and R3, and the third radial distance range is the radial distance range beyond R3. FIG. 11B is an example diagram 1150 illustrating four cross-section views taken respectively at four locations 1112 (e.g., 0 degrees), 1114 (e.g., 90 degrees). 1116 (e.g., 180 degrees), and 1118 (e.g., 270 degrees) as shown in FIG. 11A. FIG. 11B further shows that the first radial distance range 1162 corresponds to a data zone, the second radial distance range 1164 corresponds to a load/unload zone, and the third radial distance range 1166 corresponds to an EPO zone.

In the example shown in FIGS. 11A and 11B, the first, second, and third localized height thresholds respectively corresponding to the first, second, and third radial distance ranges may be determined based on Equation (3.1), Equation (3.2), and Equation (3.3), respectively. Hence, for example, a localized height value measured in the first radial distance range may be compared with the first localized height threshold, while another localized height value measured in the second radial distance range may be compared with the second localized height threshold.

Figures 12A, 12B:
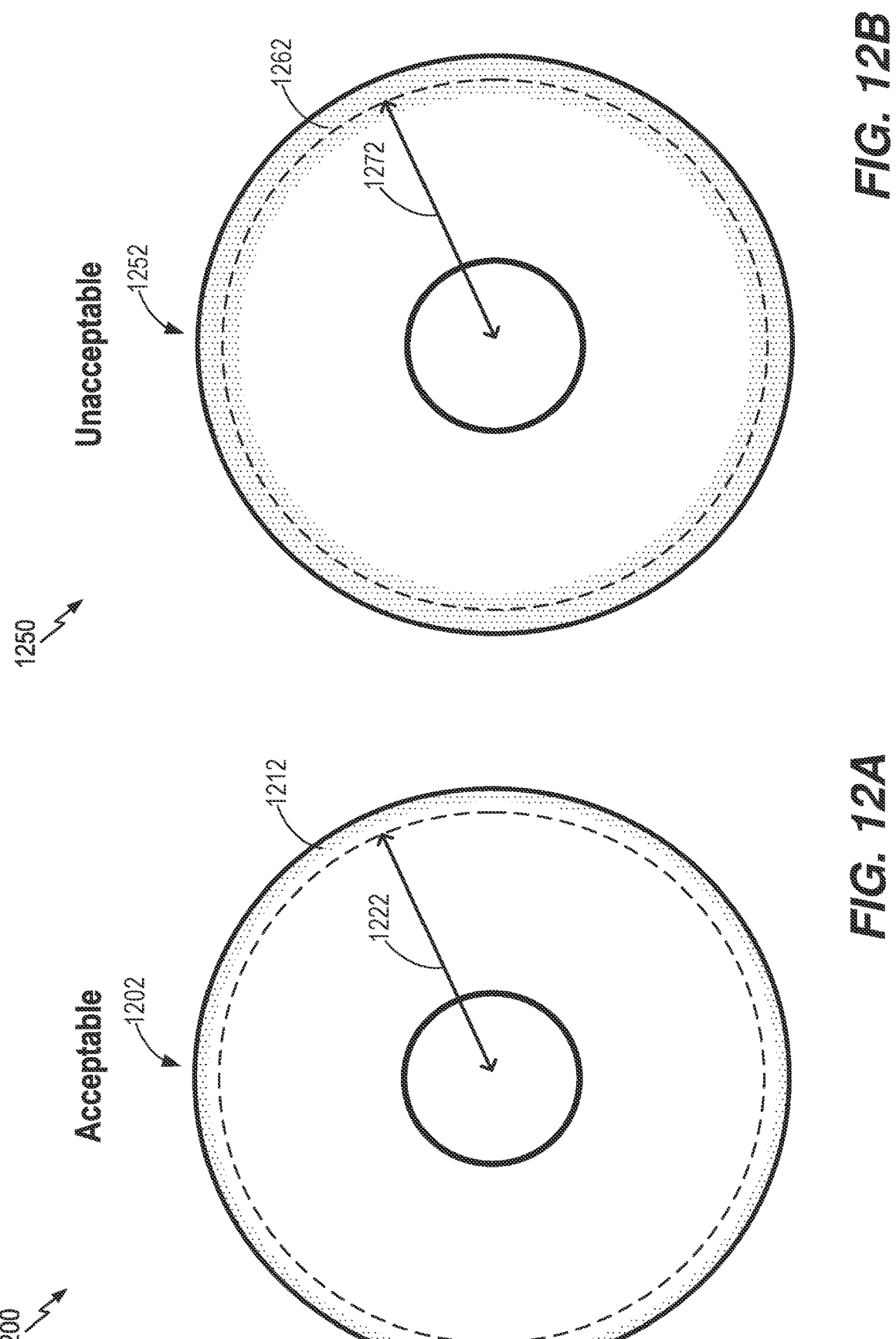
FIGS. 12A and 12B are example diagrams illustrating an acceptable substrate and an unacceptable substrate based localized height values compared with the localized height threshold, according to some aspects.

In some aspects, when determining whether to utilize the substrate, the following determinations may be made, depending on locations of localized height values exceeding the localized height threshold. If a shortest distance from a center of the substrate corresponding to a localized height value exceeding the localized height threshold is greater than a radial distance threshold, a determination is made that the substrate is acceptable for the magnetic medium. On the other hand, if the shortest distance from the center of the substrate corresponding to the localized height value exceeding the localized height threshold is less than or equal to the radial distance threshold, a determination is made that the substrate is unacceptable for the magnetic medium. For example, let's assume that 100 localized height values are measured respectively at 100 distances from the center of the substrate, and 20 of the 100 localized height values exceed the localized height threshold, where these 20 localized height values are respectively measured at 20 distances from the center of the substrate. In this example, a shortest distance out of the 20 distances corresponding to the 20 localized height values exceeding the localized height threshold is determined. If this shortest distance is greater than the radial distance threshold, then this may indicate that there is at least a minimum acceptable substrate surface suitable for use as the data surface, and thus the substrate is acceptable for magnetic medium. On the other hand, if this shortest distance is less than or equal to the radial distance threshold, this may indicate that there is insufficient substrate surface suitable for use as the data surface and thus the substrate is unacceptable for magnetic medium. In one aspect, the radial distance threshold can correspond to a minimum amount of recordable area needed for the magnetic medium to conform to preselected drive requirements. Thus, stated another way, if the localized height excesses are sufficiently beyond the radial distance that marks the minimum recordable area (e.g., that begins at the ID), the disk may be suitable as a magnetic medium. If they are not, the disk may not be suitable as a magnetic medium FIGS. 12A and 12B are example diagrams illustrating an acceptable substrate and an unacceptable substrate, respectively, based on localized height values compared with the localized height threshold, according to some aspects. FIG. 12A is an example diagram 1200 illustrating an acceptable substrate 1202 based on the localized height values compared with the localized height threshold, according to some aspects. In FIG. 12A, a shaded region 1212 represents an area where localized height values exceed the localized height threshold. As shown in FIG. 12A, the shortest distance from a center of the substrate 1202 to the shaded region 1212 (e.g., corresponding to a localized height value exceeding the localized height threshold) is greater than a radial distance threshold 1222, which may indicate that there is sufficient area of the substrate suitable for use as the data surface (e.g., that portion of the substrate surface where data may be stored and/or retrieved). Therefore, a determination is made that the substrate 1202 is acceptable for the magnetic medium. For example, the radial distance threshold 1222 may be predetermined based on a design of a particular disk drive to meet a certain storage capacity. Hence, the radial distance threshold 1222 may be greater for a disk drive with a higher storage capacity specification. In an example, the radial distance threshold 1222 may be determined by subtracting 200 microns from a radius measured radially from a center of the substrate 1202 to a chamfer of the substrate 1202.

FIG. 12B is an example diagram 1200 illustrating an unacceptable substrate 1252 based on the localized height values compared with the localized height threshold, according to some aspects. In FIG. 12B, a shaded region 1262 represents an area where localized height values exceed the localized height threshold. As shown in FIG. 12B, the shortest distance from a center of the substrate 1202 to the shaded region 1262 (e.g., corresponding to a localized height value exceeding the localized height threshold) is less than a radial distance threshold 1272, which may indicate that there is insufficient area of the substrate suitable for use as the data surface. Therefore, a determination is made that the substrate 1252 is unacceptable for the magnetic medium.

In some aspects, the localized height values may include multiple sets of localized height values respectively corresponding to the various distances from the center of the substrate, where each set of localized height values corresponds to a respective one of the various distances. For example, a first set of localized height values may be localized height values at a first radial distance from the center of the substrate, and a second set of localized height values may be localized height values at a second radial distance from the center of the substrate.

In this case, where the localized height values may include multiple sets of localized height values, in an aspect, for each set of localized height values, a highest localized height value (e.g., maximum localized height value) may be considered. Hence, maximum localized height values respectively for the multiple sets of localized height values that respectively correspond to the various distances are determined. Here, each maximum localized height value of the maximum localized height values is a maximum value of localized height values of a respective set of the multiple sets localized height values. For example, a highest localized height value from the first set of localized height values may be determined, and a highest localized height value from the second set of localized height values may be determined. In this aspect, if a shortest distance from a center of the substrate corresponding to a maximum localized height value of the maximum localized height values that exceeds the localized height threshold is less than or equal to a radial distance threshold, a determination is made that the substrate is acceptable for the magnetic medium. Further, in this aspect, if the shortest distance from the center of the substrate corresponding to the maximum localized height value of the maximum localized height values that exceeds the localized height threshold is less than or equal to the radial distance threshold, a determination is made that the substrate is unacceptable for the magnetic medium.

In another aspect, for each set of localized height values, an average localized height value may be considered, where the average localized height value is an average of localized height values from a respective set. Hence, average localized height values respectively for the multiple sets of localized height values that respectively correspond to the various distances are determined. Here, each average localized height value of the average localized height values is an average value of localized height values of a respective set of the multiple sets of localized height values. For example, a first average localized height value based on localized height values from the first set of localized height values may be determined, and a second average localized height value based on localized height values from the second set of localized height values may be determined. In this aspect, if a shortest distance from a center of the substrate corresponding to an average localized height value of the average localized height values that exceeds the localized height threshold is less than or equal to a radial distance threshold, a determination is made that the substrate is acceptable for the magnetic medium. Further, in this aspect, if the shortest distance from the center of the substrate corresponding to the average localized height value of the average localized height values that exceeds the localized height threshold is less than or equal to the radial distance threshold, a determination is made that the substrate is unacceptable for the magnetic medium.

In an aspect, a data zone on the substrate to record data is identified based on the localized height threshold and the localized height values. By identifying the data zone, the slider may be unloaded when the slider reaches the data zone, thereby minimizing errors. For example, areas near the OD with the localized height values exceeding the localized height threshold may be excluded from the data zone.

In an aspect, if it is determined that a localized height value of the localized height values that corresponds to a particular distance of the various distances exceeds the localized height threshold, a portion of the surface of the substrate that is beyond this particular distance of the distances from the center of the substrate is excluded from the data zone.

As discussed above, in some aspects, the localized height values may include multiple sets of localized height values respectively corresponding to the various distances from the center of the substrate, where each set of localized height values corresponds to a respective one of the various distances. For example, a first set of localized height values may be localized height values at a first radial distance from the center of the substrate, and a second set of localized height values may be localized height values at a second radial distance from the center of the substrate.

In this case where the localized height values may include multiple sets of localized height values, for each set of localized height values, a highest localized height value (e.g., maximum localized height value) may be considered. Hence, maximum localized height values respectively for the multiple sets of localized height values that respectively correspond to the various distances are determined. Here, each maximum localized height value of the maximum localized height values is a maximum value of localized height values of a respective set of the multiple sets localized height values. In this aspect, when identifying the data zone, if a maximum localized height value of the maximum localized height values that corresponds to a particular distance of the various distances exceeds the localized height threshold, a portion on the surface of the substrate that is beyond this particular distance from the center of the substrate is excluded from the data zone.

In another aspect, for each set of localized height values, an average localized height value may be considered, where the average localized height value is an average of localized height values from a respective set. Hence, average localized height values respectively for the multiple sets of localized height values that respectively correspond to the various distances are determined. Here, each average localized height value of the average localized height values is an average value of localized height values of a respective set of the multiple sets of localized height values. In this aspect, when identifying the data zone, if an average localized height value of the average localized height values that corresponds to a particular distance of the various of distances exceeds the localized height threshold, a portion on the surface of the substrate that is beyond this particular distance from the center of the substrate is excluded from the data zone.

Figure 13:
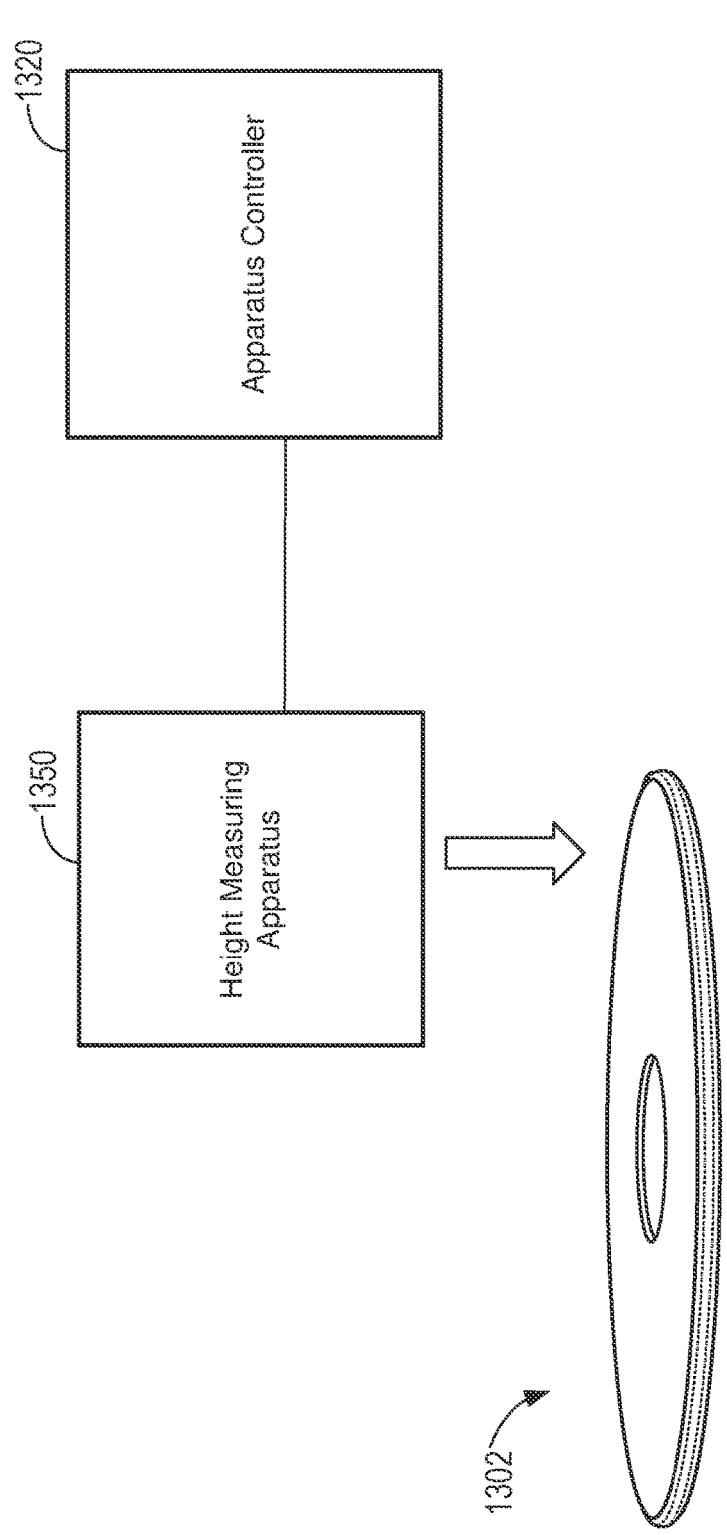
FIG. 13 illustrates an exemplary diagram for an apparatus for identifying a substrate suitable for use within a magnetic medium of a data storage device configured for magnetic recording, according to some aspects.

FIG. 13 illustrates an exemplary diagram for an apparatus 1300 for identifying a substrate suitable for use within a magnetic medium of a data storage device configured for magnetic recording, according to some aspects. In FIG. 13, the apparatus 1300 may include an apparatus controller 1320 and a height measuring apparatus 1350. In particular, the apparatus controller 1320 identifies one or more dimensions of a slider of the data storage device to be used in conjunction with the magnetic medium (or is pre-programmed with such parameters), and determines a measurement length and a localized height threshold as a function of the one or more dimensions of the slider. The height measuring apparatus 1350 measures localized height values of a substrate 1302 at various distances from a center of the substrate, each of the localized height values measured within the measurement length and at one of the various distances. Subsequently, the apparatus controller 1320 compares the localized height values and the localized height threshold, and determines whether to utilize the substrate for the magnetic recording medium (e.g., of an HDD) based on the comparison and as described above. There are several ways (equipment types) to measure height distribution of a disk surface. In one aspect, if heights of particular points are measured, they can be stitched together to cover the entire surface as long as the datum position is common for all measurements. Another way is to capture Newton rings from an entire surface and convert fringe information to height distributions. Since roll-off is in the radial direction, the fringe method may be more convenient.

FIG. 14 illustrates a method 1400 for identifying a substrate suitable for use within a magnetic medium of a data storage device configured for magnetic recording, according to some aspects. In some aspects, the method 1400 may be performed by an apparatus for identifying a substrate suitable for use within a magnetic medium of a data storage device configured for magnetic recording, such as the apparatus 1300 of FIG. 13.

At block 1405, the apparatus identifies one or more dimensions of a slider of the data storage device to be used in conjunction with the magnetic medium. In one aspect, the apparatus may be preprogrammed with these dimensions or with a set of potential sliders and corresponding dimensions. In one aspect, the apparatus receives the dimensions from a user. In one aspect, the user is prompted to enter the information via a graphical user interface.

At block 1410, the apparatus determines a measurement length and a localized height threshold as a function of the one or more dimensions of the slider.

In an aspect, the determining the localized height threshold at block 1410 includes determining the localized height threshold based on the measurement length, where the measurement length is based on a length and a width of a rectangular surface of the slider configured to face a surface of the magnetic medium and is further based on a skew angle of the rectangular surface, the skew angle being an angle between a line parallel to the length of the rectangular surface and a data track on the magnetic medium. In this aspect, the measurement length is a sum of the length of the rectangular surface multiplied by a sine value of the skew angle and the width of the rectangular multiplied by a cosine value of the skew angle. In some aspects, the localized height threshold is 500 nanometers multiplied by a square of a ratio of the width of the rectangular surface the slider to the measurement length.

At block 1415, the apparatus measures a plurality of localized height values of the substrate at a plurality of distances from a center of the substrate, each of the plurality of localized height values measured within the measurement length and at one of the plurality of distances.

In an aspect, the plurality of localized height values are measured along a plurality of measurement lines on a surface of the substrate, each of the plurality of measurement lines being a straight line directed toward the center of the substrate and having a length equal to the measurement length. In this aspect, each of the plurality of localized height values is measured based on a difference between a highest point and a lowest point on the surface of the substrate along a respective measurement line of the plurality of measurement lines.

At block 1420, the apparatus compares the plurality of localized height values and the localized height threshold.

In an aspect, where the localized height threshold includes a plurality of localized height thresholds respectively corresponding to a plurality of radial distance ranges from the center of the substrate, the determining the localized height threshold at block 1410 includes determining the plurality of localized height thresholds based on the measurement length and further based on the plurality of radial distance ranges from the center of the substrate. In this aspect, the comparing the plurality of localized height values and the localized height threshold at block 1420 includes comparing the plurality of localized height values and the plurality of localized height thresholds, wherein each localized height value is compared with a respective one of the plurality of localized height thresholds that corresponds to a respective radial distance range of the plurality of radial distance ranges.

In an aspect, the plurality of radial distance ranges respectively correspond to a plurality of radial distance constants, and each of the plurality of localized height thresholds is determined based on a respective radial distance constant of the plurality of radial distance constants multiplied by a square of a ratio of the width of the rectangular surface of the slider to the measurement length.

At block 1425, the apparatus determines to utilize the substrate for the magnetic medium based on the comparison of the plurality of localized height values and the localized height threshold.

In an aspect, the determining to utilize the substrate at block 1425 includes determining that the substrate is acceptable for the magnetic medium in response to determining that a shortest distance from a center of the substrate corresponding to a localized height value exceeding the localized height threshold is greater than a radial distance threshold, and determining that the substrate is unacceptable for the magnetic medium in response to determining that the shortest distance from the center of the substrate corresponding to the localized height value exceeding the localized height threshold is less than or equal to the radial distance threshold.

In an aspect, the plurality of localized height values includes a plurality of sets of localized height values respectively corresponding to the plurality of distances from a center of the substrate, each set of localized height values corresponding to a respective one of the plurality of distances. In this aspect, the determining to utilize the substrate at block 1425 includes: determining a plurality of maximum localized height values respectively for the plurality of sets of localized height values that respectively correspond to the plurality of distances, each maximum localized height value of the plurality of maximum localized height values being a maximum value of localized height values of a respective set of the plurality of sets; determining that the substrate is acceptable for the magnetic medium when a shortest distance from a center of the substrate corresponding to a maximum localized height value of the plurality of maximum localized height values that exceeds the localized height threshold is greater than a radial distance threshold; and determining that the substrate is unacceptable for the magnetic medium when the shortest distance from the center of the substrate corresponding to the maximum localized height value of the plurality of maximum localized height values that exceeds the localized height threshold is less than or equal to the radial distance threshold.

In an aspect, the plurality of localized height values include a plurality of sets of localized height values respectively corresponding to the plurality of distances from a center of the substrate, each set of localized height values corresponding to a respective one of the plurality of distances. In this aspect, the determining to utilize the substrate at block 1425 includes: determining a plurality of average localized height values respectively for the plurality of sets of localized height values that respectively correspond to the plurality of distances, each average localized height value of the plurality of average localized height values being an average value of localized height values of a respective set of the plurality of sets; determining that the substrate is acceptable for the magnetic medium when a shortest distance from a center of the substrate corresponding to an average localized height value of the plurality of average localized height values that exceeds the localized height threshold is greater than a radial distance threshold; and determining that the substrate is unacceptable for the magnetic medium when the shortest distance from the center of the substrate corresponding to the average localized height value of the plurality of average localized height values that exceeds the localized height threshold is less than or equal to the radial distance threshold.

In some aspects, at block 1430, the apparatus may identify a data zone on a surface of the substrate to record data based on the localized height threshold and the plurality of localized height values.

In an aspect, the identifying the data zone at block 1430 includes determining that a localized height value of the plurality of localized height values that corresponds to a distance of the plurality of distances exceeds the localized height threshold; and excluding, from the data zone, a portion on the surface of the substrate that is beyond the distance of the plurality of distances from the center of the substrate.

In some aspects, the plurality of localized height values include a plurality of sets of localized height values respectively corresponding to the plurality of distances from a center of the substrate, each set of localized height values corresponding to a respective one of the plurality of distances. In this aspect, the identifying the data zone at block 1430 includes determining a plurality of maximum localized height values respectively for the plurality of sets of localized height values that respectively correspond to the plurality of distances, each maximum localized height value of the plurality of maximum localized height values being a maximum value of localized height values of a respective set of the plurality of sets; determining that a maximum localized height value of the plurality of maximum localized height values that corresponds to a distance of the plurality of distances exceeds the localized height threshold; and excluding, from the data zone, a portion on the surface of the substrate that is beyond the distance of the plurality of distances from the center of the substrate.

In some aspects, the plurality of localized height values include a plurality of sets of localized height values respectively corresponding to the plurality of distances from a center of the substrate, each set of localized height values corresponding to a respective one of the plurality of distances. In this aspect, the identifying the data zone at block 1430 includes determining a plurality of average localized height values respectively for the plurality of sets of localized height values that respectively correspond to the plurality of distances, each average localized height value of the plurality of average localized height values being an average value of localized height values of a respective set of the plurality of sets; determining that an average localized height value of the plurality of average localized height values that corresponds to a distance of the plurality of distances exceeds the localized height threshold; and excluding, from the data zone, a portion on the surface of the substrate that is beyond the distance of the plurality of distances from the center of the substrate.

In an aspect, the measurement length includes a plurality of measurement lengths and the localized height threshold includes a plurality of localized height thresholds, wherein each of the plurality of localized height values are measured within a respective one of the plurality of measurement lengths and at one of the plurality of distances, and wherein the comparing the plurality of localized height values and the localized height threshold comprises comparing the plurality of localized height values and the plurality of localized height thresholds, respectively, wherein each of the plurality of localized height values is compared with a respective one of the plurality of localized height values.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises." "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on. The term "about 'value X'", or "approximately value X," as used in the disclosure shall mean within 10 percent of the 'value X'. For example, a value of about 1 or approximately 1, would mean a value in a range of 0.9-1.1. In one aspect, "about" as used herein may instead mean 5 percent. In this disclosure, various numerical values are presented. Unless specifically indicated otherwise, it is contemplated that these numerical values may have a tolerance of 10 percent. In another aspect, the tolerance may be 5 percent. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. Various components described in this specification may be described as "including" or made of certain materials or compositions of materials. In one aspect, this can mean that the component consists of the particular material(s). In another aspect, this can mean that the component comprises the particular material(s).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A method of identifying a substrate suitable for use within a magnetic medium of a data storage device configured for magnetic recording, comprising:

identifying one or more dimensions of a slider of the data storage device to be used in conjunction with the magnetic medium;

determining a measurement length and a localized height threshold as a function of the one or more dimensions of the slider;

measuring a plurality of localized height values of the substrate at a plurality of distances from a center of the substrate, each of the plurality of localized height values measured within the measurement length and at one of the plurality of distances;

comparing the plurality of localized height values and the localized height threshold; and determining to utilize the substrate for the magnetic medium based on the comparison of the plurality of localized height values and the localized height threshold.

2. The method of claim 1, wherein the plurality of localized height values are measured along a plurality of measurement lines on a surface of the substrate, each of the plurality of measurement lines being a straight line directed toward the center of the substrate and having a length equal to the measurement length.

3. The method of claim 2, wherein each of the plurality of localized height values is measured based on a difference between a highest point and a lowest point on the surface of the substrate along a respective measurement line of the plurality of measurement lines.

4. The method of claim 1, wherein the determining the localized height threshold comprises determining the localized height threshold based on the measurement length, and wherein the measurement length is based on a length and a width of a rectangular surface of the slider configured to face a surface of the magnetic medium and is further based on a skew angle of the rectangular surface, the skew angle being an angle between a line parallel to the length of the rectangular surface and a data track on the magnetic medium.

5. The method of claim 4, wherein the measurement length is a sum of the length of the rectangular surface multiplied by a sine value of the skew angle and the width of the rectangular multiplied by a cosine value of the skew angle.

6. The method of claim 4, wherein the localized height threshold is 500 nanometers multiplied by a square of a ratio of the width of the rectangular surface the slider to the measurement length.

7. The method of claim 4, wherein the localized height threshold includes a plurality of localized height thresholds respectively corresponding to a plurality of radial distance ranges from the center of the substrate, wherein the determining the localized height threshold comprises determining the plurality of localized height thresholds based on the measurement length and further based on the plurality of radial distance ranges from the center of the substrate, and wherein the comparing the plurality of localized height values and the localized height threshold comprises comparing the plurality of localized height values and the plurality of localized height thresholds, wherein each localized height value is compared with a respective one of the plurality of localized height thresholds that corresponds to a respective radial distance range of the plurality of radial distance ranges.

8. The method of claim 7, wherein the plurality of radial distance ranges respectively correspond to a plurality of radial distance constants, and wherein each of the plurality of localized height thresholds is determined based on a respective radial distance constant of the plurality of radial distance constants multiplied by a square of a ratio of the width of the rectangular surface of the slider to the measurement length.

9. The method of claim 1, wherein the determining to utilize the substrate comprises:

determining that the substrate is acceptable for the magnetic medium in response to determining that a shortest distance from a center of the substrate corresponding to a localized height value exceeding the localized height threshold is greater than a radial distance threshold; and determining that the substrate is unacceptable for the magnetic medium in response to determining that the shortest distance from the center of the substrate corresponding to the localized height value exceeding the localized height threshold is less than or equal to the radial distance threshold.

10. The method of claim 1, wherein the plurality of localized height values includes a plurality of sets of localized height values respectively corresponding to the plurality of distances from a center of the substrate, each set of localized height values corresponding to a respective one of the plurality of distances, and wherein the determining to utilize the substrate comprises:

determining a plurality of maximum localized height values respectively for the plurality of sets of localized height values that respectively correspond to the plurality of distances, each maximum localized height value of the plurality of maximum localized height values being a maximum value of localized height values of a respective set of the plurality of sets;

determining that the substrate is acceptable for the magnetic medium when a shortest distance from a center of the substrate corresponding to a maximum localized height value of the plurality of maximum localized height values that exceeds the localized height threshold is greater than a radial distance threshold; and determining that the substrate is unacceptable for the magnetic medium when the shortest distance from the center of the substrate corresponding to the maximum localized height value of the plurality of maximum localized height values that exceeds the localized height threshold is less than or equal to the radial distance threshold.

11. The method of claim 1, wherein the plurality of localized height values include a plurality of sets of localized height values respectively corresponding to the plurality of distances from a center of the substrate, each set of localized height values corresponding to a respective one of the plurality of distances, and wherein the determining to utilize the substrate comprises:

determining a plurality of average localized height values respectively for the plurality of sets of localized height values that respectively correspond to the plurality of distances, each average localized height value of the plurality of average localized height values being an average value of localized height values of a respective set of the plurality of sets;

determining that the substrate is acceptable for the magnetic medium when a shortest distance from a center of the substrate corresponding to an average localized height value of the plurality of average localized height values that exceeds the localized height threshold is greater than a radial distance threshold; and determining that the substrate is unacceptable for the magnetic medium when the shortest distance from the center of the substrate corresponding to the average localized height value of the plurality of average localized height values that exceeds the localized height threshold is less than or equal to the radial distance threshold.

12. The method of claim 1, further comprising:

identifying a data zone on a surface of the substrate to record data based on the localized height threshold and the plurality of localized height values.

13. The method of claim 12, wherein the identifying the data zone comprises:

determining that a localized height value of the plurality of localized height values that corresponds to a distance of the plurality of distances exceeds the localized height threshold; and excluding, from the data zone, a portion on the surface of the substrate that is beyond the distance of the plurality of distances from the center of the substrate.

14. The method of claim 12, wherein the plurality of localized height values include a plurality of sets of localized height values respectively corresponding to the plurality of distances from a center of the substrate, each set of localized height values corresponding to a respective one of the plurality of distances, and wherein the identifying the data zone comprises:

determining a plurality of maximum localized height values respectively for the plurality of sets of localized height values that respectively correspond to the plurality of distances, each maximum localized height value of the plurality of maximum localized height values being a maximum value of localized height values of a respective set of the plurality of sets;

determining that a maximum localized height value of the plurality of maximum localized height values that corresponds to a distance of the plurality of distances exceeds the localized height threshold; and excluding, from the data zone, a portion on the surface of the substrate that is beyond the distance of the plurality of distances from the center of the substrate.

15. The method of claim 12, wherein the plurality of localized height values include a plurality of sets of localized height values respectively corresponding to the plurality of distances from a center of the substrate, each set of localized height values corresponding to a respective one of the plurality of distances, and wherein the identifying the data zone comprises:

determining a plurality of average localized height values respectively for the plurality of sets of localized height values that respectively correspond to the plurality of distances, each average localized height value of the plurality of average localized height values being an average value of localized height values of a respective set of the plurality of sets;

determining that an average localized height value of the plurality of average localized height values that corresponds to a distance of the plurality of distances exceeds the localized height threshold; and excluding, from the data zone, a portion on the surface of the substrate that is beyond the distance of the plurality of distances from the center of the substrate.

16. The method of claim 1, wherein the measurement length includes a plurality of measurement lengths and the localized height threshold includes a plurality of localized height thresholds, wherein each of the plurality of localized height values are measured within a respective one of the plurality of measurement lengths and at one of the plurality of distances, and wherein the comparing the plurality of localized height values and the localized height threshold comprises comparing the plurality of localized height values and the plurality of localized height thresholds, respectively, wherein each of the plurality of localized height values is compared with a respective one of the plurality of localized height values.

17. A method of identifying a substrate suitable for use within a magnetic medium of a data storage device configured for magnetic recording, comprising:

identifying one or more dimensions of a slider of the data storage device to be used in conjunction with the magnetic medium;

determining a measurement length and a localized height threshold as a function of the one or more dimensions of the slider;

measuring a plurality of localized height values of the substrate at a plurality of distances from a center of the substrate, each of the plurality of localized height values measured within the measurement length and at one of the plurality of distances;

comparing the plurality of localized height values and the localized height threshold; and identifying a data zone on the substrate to record data based on the comparison of the plurality of localized height values and the localized height threshold.

18. The method of claim 17, wherein the identifying the data zone comprises:

determining that a first localized height value of the plurality of localized height values measured at a first distance of the plurality of distances exceeds the localized height threshold; and excluding, from the data zone, a portion of a surface of the substrate that is beyond the first distance from a center of the substrate.

19. The method of claim 17, wherein the plurality of localized height values includes a plurality of sets of localized height values measured at the respective plurality of distances from a center of the substrate, each set of localized height values corresponding to a respective one of the plurality of distances, and wherein the identifying the data zone comprises:

determining a plurality of maximum localized height values respectively for the plurality of sets of localized height values that respectively correspond to the plurality of distances, each maximum localized height value of the plurality of maximum localized height values being a maximum value of localized height values of a respective set of the plurality of sets;

determining that a maximum localized height value, of the plurality of maximum localized height values that was measured at a first distance of the plurality of distances, exceeds the localized height threshold; and excluding, from the data zone, a portion of a surface of the substrate that is beyond the first distance from the center of the substrate.

20. The method of claim 17, wherein the plurality of localized height values includes a plurality of sets of localized height values measured at the respective plurality of distances from a center of the substrate, each set of localized height values corresponding to a respective one of the plurality of distances, and wherein the identifying the data zone comprises:

determining a plurality of average localized height values respectively for the plurality of sets of localized height values that respectively correspond to the plurality of distances, each average localized height value of the plurality of average localized height values being an average value of localized height values of a respective set of the plurality of sets;

determining that an average localized height value of the plurality of average localized height values that corresponds to a first distance of the plurality of distances exceeds the localized height threshold; and excluding, from the data zone, a portion of a surface of the substrate that is beyond the first distance from the center of the substrate.

21. The method of claim 17, wherein the measurement length includes a plurality of measurement lengths and the localized height threshold includes a plurality of localized height thresholds, wherein each of the plurality of localized height values are measured within a respective one of the plurality of measurement lengths and at one of the plurality of distances, and wherein the comparing the plurality of localized height values and the localized height threshold comprises comparing the plurality of localized height values and the plurality of localized height thresholds, respectively, wherein each of the plurality of localized height values is compared with a respective one of the plurality of localized height values.

* * * * *